US012052808B2

(12) United States Patent
Gordin et al.

(10) Patent No.: US 12,052,808 B2
(45) Date of Patent: Jul. 30, 2024

(54) APPARATUS, METHOD, AND SYSTEM FOR PRODUCING LED FIREWORKS AND THEATRICAL EFFECTS

(71) Applicant: Musco Corporation, Oskaloosa, IA (US)

(72) Inventors: Myron Gordin, Oskaloosa, IA (US); David L. Barker, Ottumwa, IA (US); Brady L. Dieleman, Pella, IA (US); Kenneth G. Lewis, Jr., New Sharon, IA (US); Ian J. Veenstra, Des Moines, IA (US); Timothy J. Boyle, Oskaloosa, IA (US); James F. Marshall, Oskaloosa, IA (US)

( * ) Notice: Subject to any disclaimer, the term of this patent is extended or adjusted under 35 U.S.C. 154(b) by 61 days.

(21) Appl. No.: 17/965,107

(22) Filed: Oct. 13, 2022

(65) Prior Publication Data

US 2023/0164897 A1 May 25, 2023

Related U.S. Application Data

(60) Provisional application No. 63/281,839, filed on Nov. 22, 2021.

(51) Int. Cl.
*H05B 47/155* (2020.01)
*F21V 21/14* (2006.01)
(Continued)

(52) U.S. Cl.
CPC ........... *H05B 47/155* (2020.01); *F21V 21/14* (2013.01); *H05B 45/20* (2020.01); *F21Y 2115/10* (2016.08)

(58) Field of Classification Search
CPC ....... H05B 47/155; H05B 45/20; F21V 21/14; F21Y 2115/10
See application file for complete search history.

(56) References Cited

U.S. PATENT DOCUMENTS 4,423,471 A * 12/1983 Gordin .................... F21V 29/83 362/264
6,709,145 B1 3/2004 Huang
(Continued)

FOREIGN PATENT DOCUMENTS

JP 3107469 U 2/2005
KR 101401285 B1 6/2014
(Continued)

OTHER PUBLICATIONS

WIPO with KIPO acting as the International Search Authority (ISA) for PCT/US2022/048648, see the International Search Report (ISR) that is attached hereto, issued Mar. 16, 2023.

*Primary Examiner* — Mary Ellen Bowman
(74) *Attorney, Agent, or Firm* — Kurt J. Fugman; Zachary S. Pratt

(57) ABSTRACT

It is well known that fireworks are a fundamental theatrical experience for many people. However, there are individuals and certain settings that cannot experience traditional fireworks—concerns with flammability from pyrotechnic materials often leads to a ban on fireworks in areas prone to drought, for example. For areas that cannot make use of traditional fireworks, there is a need for a suitable replacement. Discussed herein are multiple approaches to emulating a traditional fireworks show, and in a manner that does not pose a burning hazard, can be used in residential areas (as well as more traditional areas), and can emulate the look and feel of traditional fireworks. Also discussed are additional features which may not be common to some fireworks shows, but enhance a theatrical experience nonetheless at a lower operating cost.

26 Claims, 32 Drawing Sheets

(51) Int. Cl.
*F21Y 115/10* (2016.01)
*H05B 45/20* (2020.01)

(56) References Cited

U.S. PATENT DOCUMENTS

| | | | | |
|---|---|---|---|---|
| 6,840,177 | B1 | 1/2005 | Hatteland | |
| 9,291,318 | B1 | 3/2016 | Benson | |
| D885,635 | S * | 5/2020 | Cao | D26/81 |
| D903,926 | S * | 12/2020 | Gong | D26/81 |
| 2003/0174515 | A1* | 9/2003 | Huang | F21V 23/0407 362/249.14 |
| 2005/0254242 | A1* | 11/2005 | Baker | F21S 4/10 362/249.16 |
| 2011/0002132 | A1 | 1/2011 | Park | |

FOREIGN PATENT DOCUMENTS

| | | | |
|---|---|---|---|
| KR | 1020200076162 | A | 6/2020 |
| KR | 102175870 | B1 | 11/2020 |

* cited by examiner

Detail A

APPARATUS, METHOD, AND SYSTEM FOR PRODUCING LED FIREWORKS AND THEATRICAL EFFECTS

This application is related to and claims benefit of U.S. Provisional Application No. 63/281,839, filed Nov. 22, 2021, the entire contents of which are incorporated herein.

TECHNICAL FIELD

The disclosure generally relates to emulating fireworks using a light source rather than traditional pyrotechnic materials. More specifically, the disclosure relates to producing fireworks and other theatrical effects from a mobile LED lighting system which (i) does not pose the same flammability issue as traditional fireworks, (ii) can be used in a variety of settings and/or producing a variety of effects, and (iii) can be used multiple times.

BACKGROUND

It is well known that fireworks are a fundamental theatrical experience for many people. However, there are individuals and certain settings that cannot experience traditional fireworks—concerns with flammability from traditional pyrotechnic materials often leads to a ban on fireworks in areas prone to drought, for example. As another example, densely populated residential areas often lack the space to safely execute a fireworks show. While there are options available to some individuals—such as traveling to a fireworks show—and some settings that can routinely host fireworks shows—such as stadiums and racetracks—fireworks shows are often relegated to a single performance once a year. However, the desire for theatrical experiences is year-round for many.

The art lacks safe, portable, multi-use alternatives to traditional fireworks, and while the proliferation of homegrown LED lightshows has approximated fireworks on a very small scale and in some regards, much more can be done to emulate the look and feel of a true fireworks show—and further, enhance the overall performance to create a more theatrical experience.

SUMMARY

For areas that cannot make use of traditional fireworks, there is a need for a suitable replacement—ideally, something that does not pose a burning hazard, can be used in residential areas (as well as more traditional areas), and can emulate the look and feel of traditional fireworks. And while a direct replacement for traditional fireworks is desirable, it would be advantageous if such a replacement was also multi-use so that a major deficiency in the art—namely, a very small window when fireworks shows are available for viewing—is overcome.

With the advent of LED lighting (e.g., because of the ability to color tune to closely match those which are naturally produced by elements used in the fireworks industry) there is an opportunity to produce lighting effects which emulate fireworks—to the point that an entire fireworks show in an array of colors and effects (e.g., sparkle, starburst) can be produced with no traditional pyrotechnic materials. However, the use of LED lighting for this purpose has been, to date, for small scale, individual use and enjoyment.

It is therefore a principle object, feature, advantage, or aspect of the present disclosure to improve over the state of the art and/or address problems, issues, or deficiencies in the art.

Envisioned is an LED lighting system with additional features and advantages which improve over the state of the art. For example, envisioned is an enhanced theatrical experience via coordinating control of the LEDs with sound and/or smoke effects. Also envisioned are apparatus and methods for making the aforementioned mobile so to reach a variety of individuals and settings. Still further, the theatrical experience can be enhanced via objects (whether stationary or mobile) temporarily highlighted against a dark sky using ultraviolet light or phosphorescent coating, and by transient sensory-type effects such as fog, bubbles, music, other sounds. Also, different kinds of lighting effects such as lasers and cold spark machines could provide additional theatrical effects.

Further objects, features, advantages, or aspects of the present disclosure may include one or more of the following: apparatus and methods for creating a variety of fireworks lighting effects (including, but not limited to, one or more of center burst effect, end burst effect, starburst effect, tail effect, sparkle effect, pinwheel effect, and fountain/waterfall effect), apparatus and methods for synchronizing sound and/or smoke effects with said fireworks lighting effects, and apparatus and methods for providing supplemental or stand-alone theatrical effects (including, but not limited to, one or more of ultraviolet or phosphorescent object effects, smoke, bubble, or other non-lighting effects, laser effects, and additional sound or music effects).

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present disclosure and therefore do not limit the scope of the disclosure. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

FIG. 9A illustrates a back perspective view, FIG. 9B illustrates a top view of FIG. 9A, FIG. 9C illustrates a back view of FIG. 9A, FIG. 9D illustrates a right-side view of FIG. 9A, and FIG. 9E illustrates a front view of FIG. 9A.

FIG. 10A illustrates a perspective view, FIG. 10B illustrates a front view, and FIG. 10C illustrates a side view. FIG. 10D illustrates a greatly enlarged, partial perspective view detailing the interaction of the resilient member subassembly with the center support subassembly of the support structure assembly of FIG. 8.

FIG. 11A illustrates in detail the interaction of the wiring with a crane jib (note the rest of the crane assembly is omitted for brevity).

FIG. 13A illustrates a center burst effect, FIG. 13B illustrates a sparkle effect coupled with an end burst effect, FIG. 13C illustrates a center burst effect coupled with a starburst effect, FIG. 13D illustrates a multi-color starburst effect, FIG. 13E illustrates a solid-color starburst effect coupled with a multi-color tail effect, FIG. 13F illustrates a traveling multi-color tail effect, FIG. 13G illustrates a sparkle effect, FIG. 13H illustrates a sparkle effect coupled with a multi-color starburst effect, FIG. 13I illustrates a pinwheel effect with travel indicated in the direction of the white arrow, and FIG. 13J illustrates a fountain or waterfall effect (depending on directional orientation of apparatuses when positioned by the crane jib of FIG. 11A).

DETAILED DESCRIPTION

Figure 1:
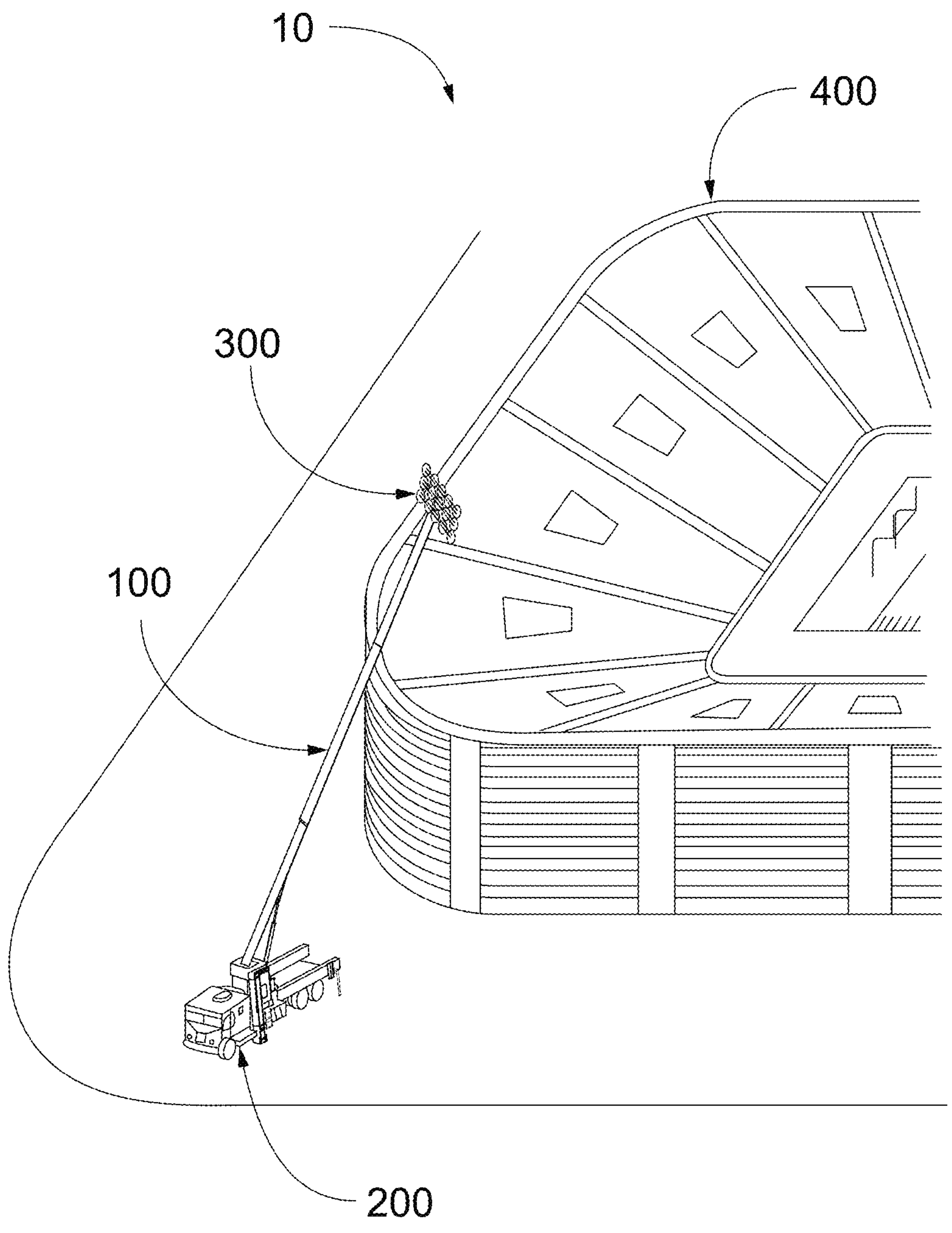
Figure 1 PRIOR ART
FIG. 1 illustrates a state-of-the-art mobile lighting system, here fully extended and positioned at a site to provide temporary lighting.

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

To further an understanding of the present disclosure, specific exemplary embodiments according to the present disclosure will be described in detail. Frequent mention will be made in this description to the drawings. Reference numbers will be used to indicate certain parts in the drawings. Unless otherwise stated, the same reference numbers will be used to indicate the same parts throughout the drawings. Further, similar reference numbers (e.g., 702, 802, 902, 1002, 1102) will be used to indicate similar parts or functionality between embodiments.

Regarding terminology, terms such as “means”, “devices”, “elements”, “parts”, “portions”, “structure”, “components”, and “members” may be used interchangeably herein, in the singular or plural, by way of convenience and not depart from aspects of the present disclosure, nor place limiting effects on aspects of the present disclosure unless explicitly stated otherwise.

Also, terms such as “having”, “including”, “with”, etc. or forms thereof are to be interpreted as being open, not limiting the parts of a structure that may be added to that structure. The term “generally linear”, “linear array” or forms thereof are to be interpreted to include arrays of items such as LEDs that follow a sweep path that is at least partially straight or is slightly curved so that a tangent at one end of the array forms an angle with a tangent at another end of the array that is less than 40 degrees.

Further regarding terminology, terms such as “show”, “emulate”, “theatrical effects”, and “theatrical experience” have been used to describe an experience, a feeling, or the like in response to the present disclosure (particularly when compared to fireworks of a traditional pyrotechnic nature). It is important to note that experiences are subjective, and that use of any of the aforementioned terms should not be considered limiting in terms of feelings evoked, accuracy in simulating or emulating traditional fireworks, or generally how the disclosure might be practiced or who might benefit from the present disclosure. Still further regarding terminology, the terms “lighting effects” and “transient sensory-type effects” have been used to differentiate between theatrical effects which are more or less both stationary and lighting-based—for example, even with pinwheel lighting effects the lights themselves do not physically move to achieve the effect—and theatrical effects which are not stationary or derive a desired effect from movement or ephemera (even if lighting-based)—for example, objects shot from an air cannon that provide a temporary, traveling effect and are later physically removed from the ground at a site. These terms are used by way of convenience to better describe both the variety of effects and the multi-use benefit of the present disclosure and should not be considered limiting in terms of what sort of theatrical experience could be provided by the present disclosure.

An example embodiment envisions a state-of-the-art mobile lighting system—for example, a 15-ton crane with outriggers installed on a vehicle or as may otherwise be described in U.S. Pat. No. 4,423,471, incorporated by reference herein in its entirety—wherein the mobile lighting is replaced with any of a variety of apparatuses later discussed, said apparatuses installed or otherwise mounted to a customized support structure assembly which is gripped, positionally affixed in situ, and directionally oriented by a custom crane jib; see FIG. 1. As can be seen, a state-of-the-art mobile lighting system 10 generally includes: mobility means 200 which generally includes a combination of vehicle, stabilizing elements, and bed for electronics, generator for powering devices, controls, and storage; a crane assembly 100 which typically includes a combination of boom and jib (and oftentimes cooling lines, hydraulics, and other elements); and a lighting assembly 300 which typically includes some number of light-producing elements, light directing devices, light redirecting devices, knuckles, crossarms, and power regulating devices (if not already on the bed of mobility means 200). In practice, mobility means 200 are situated near a venue 400 (here, a stadium), crane assembly 100 is raised, and lighting assembly 300 is aimed such that state-of-the-art mobile lighting system 10 provides temporary or more permanent supplemental lighting for the venue. This same approach can be taken for a mobile lighting system 11 designed according to the present disclosure; see FIG. 2. Here, mobility means 200 and crane assembly 100 are predominantly the same as in FIG. 1, but lighting assembly 300 has been replaced with an assembly 600 of any number or combination of apparatuses together with said customized support structure assembly, which is gripped, positionally affixed in situ, and directionally oriented by a custom crane jib assembly 500. Several non-limiting, specific examples of apparatuses which can be used in mobile lighting system 11 are presently discussed.

Figure 3:
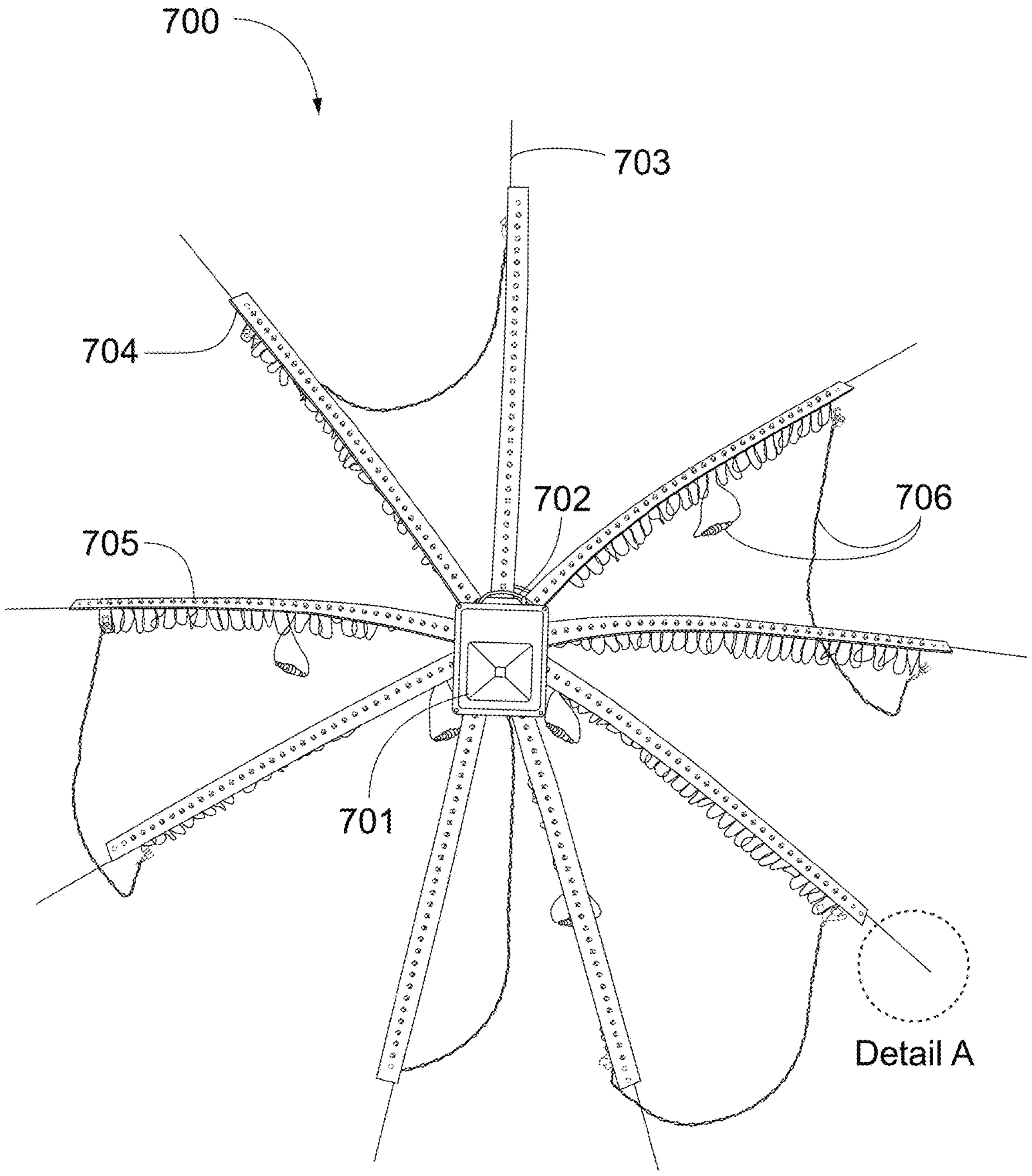
FIG. 3 illustrates a first embodiment according to aspects of the present disclosure; here an LED fireworks apparatus with a center burst LED lighting fixture and radially extending arms, each of which includes some number of LEDs generally in a linear array.
Figure 4:
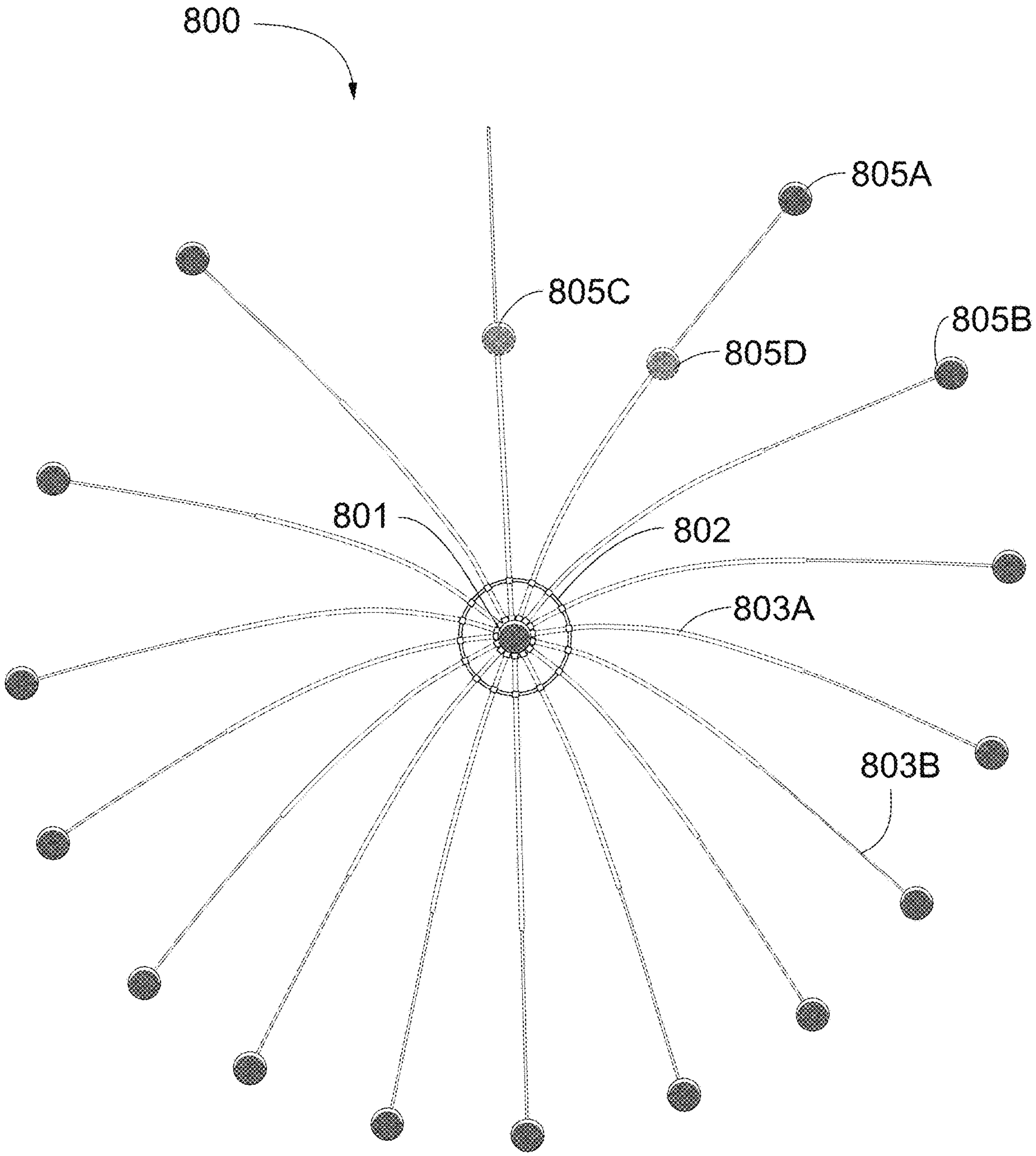
FIG. 4 illustrates a second embodiment according to aspects of the present disclosure; here an LED fireworks apparatus with a center burst LED lighting fixture, radially extending arms with no LEDs thereupon, and one or more LED lighting fixtures affixed at a distal end and/or intermediate length of said arms for additional theatrical bursts.
Figure 5:
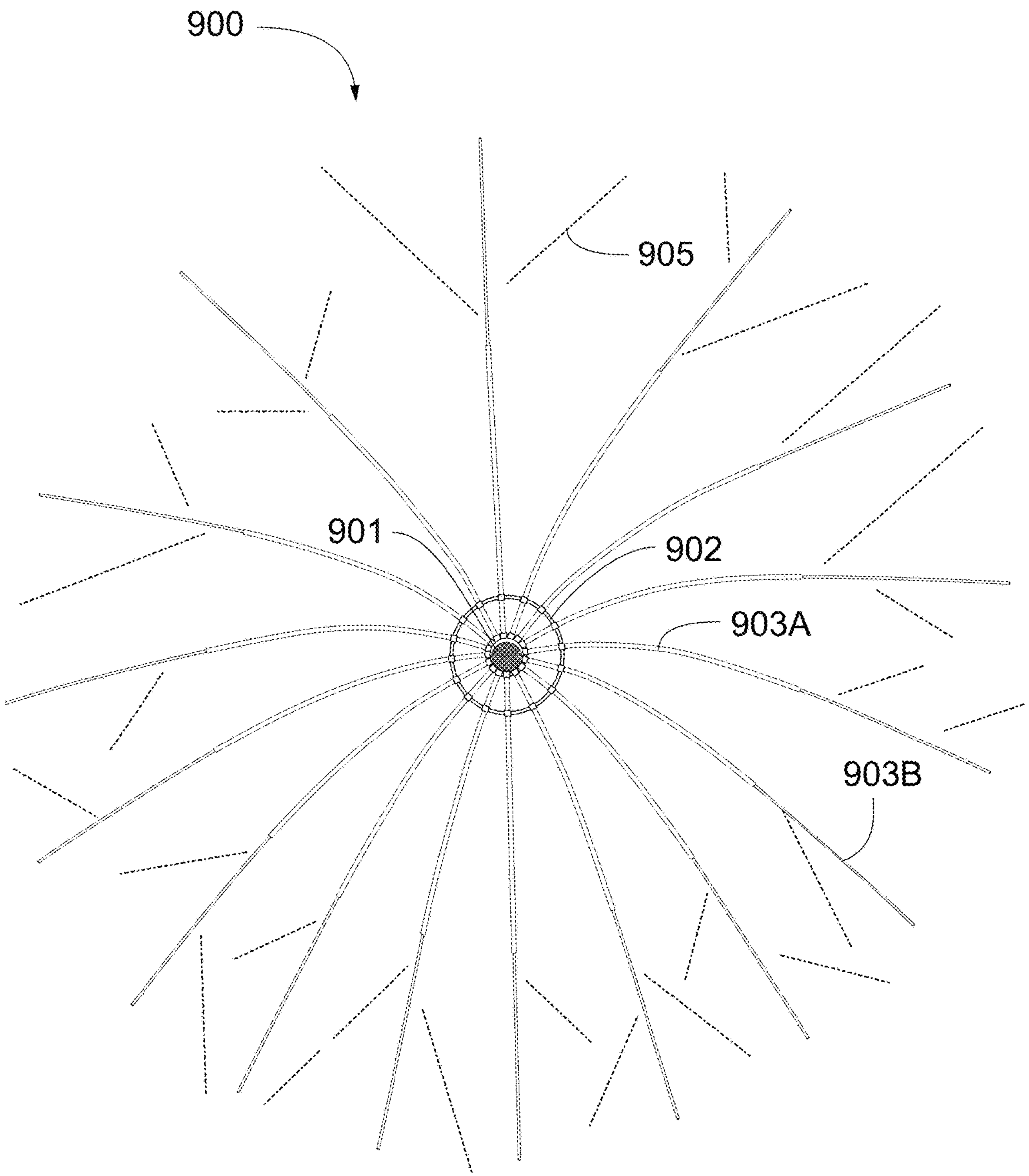
FIG. 5 illustrates a third embodiment according to aspects of the present disclosure; here an LED fireworks apparatus with a center burst LED lighting fixture, radially extending arms with no LEDs thereupon, with perforations in said arms such that light from one or more laser devices contained in said arms extends outwardly from the apparatus.
Figure 6:
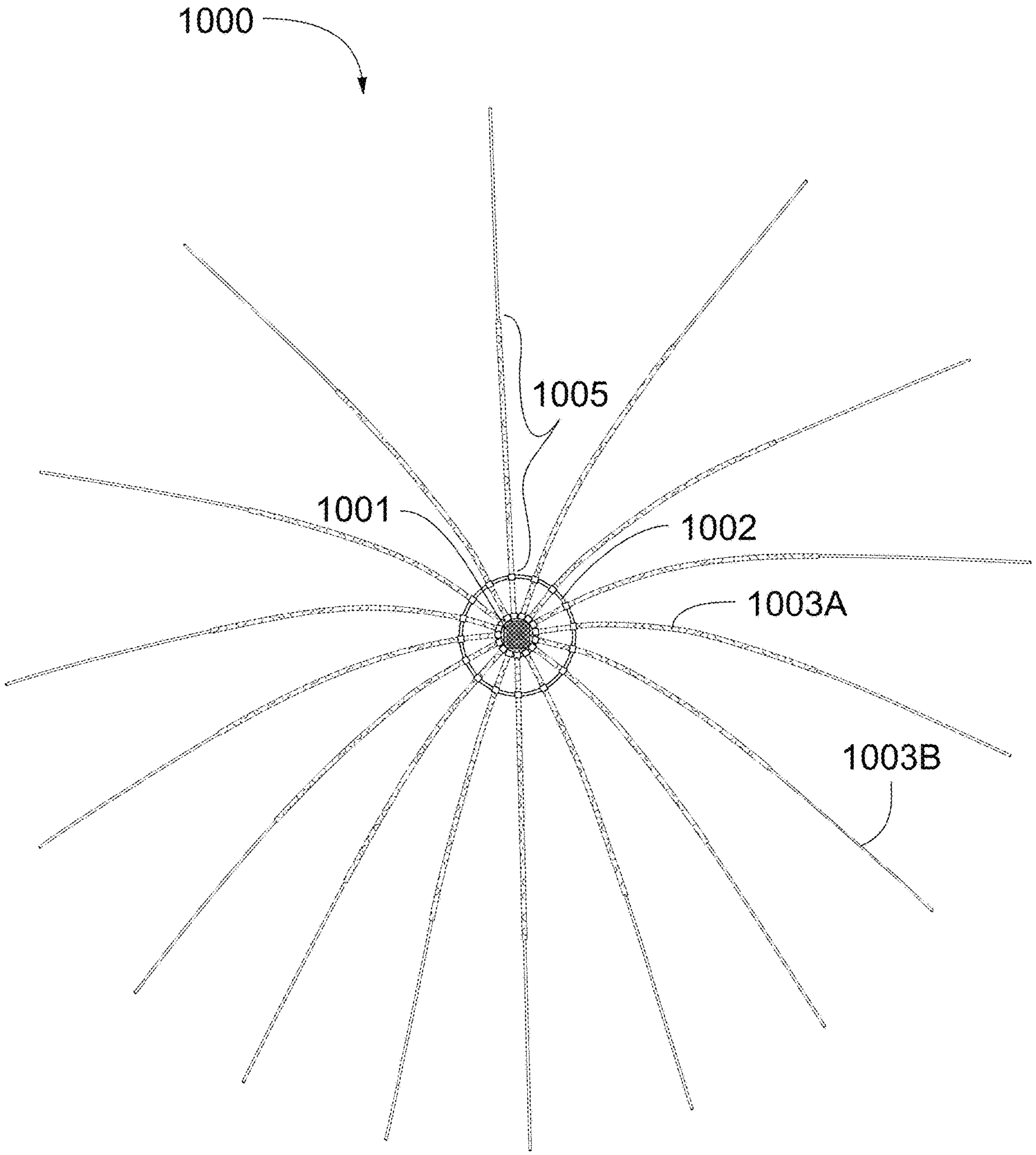
FIG. 6 illustrates a fourth embodiment according to aspects of the present disclosure; here an LED fireworks apparatus with a center UV LED lighting fixture (i.e., light emitted is at least significantly in the UV range rather than significantly in the visible range as in other embodiments) and radially extending arms, each of which includes some manner of UV-activated material (e.g., decals, paint) designed to provide theatrical effects when the center fixture is energized.
Figure 7:
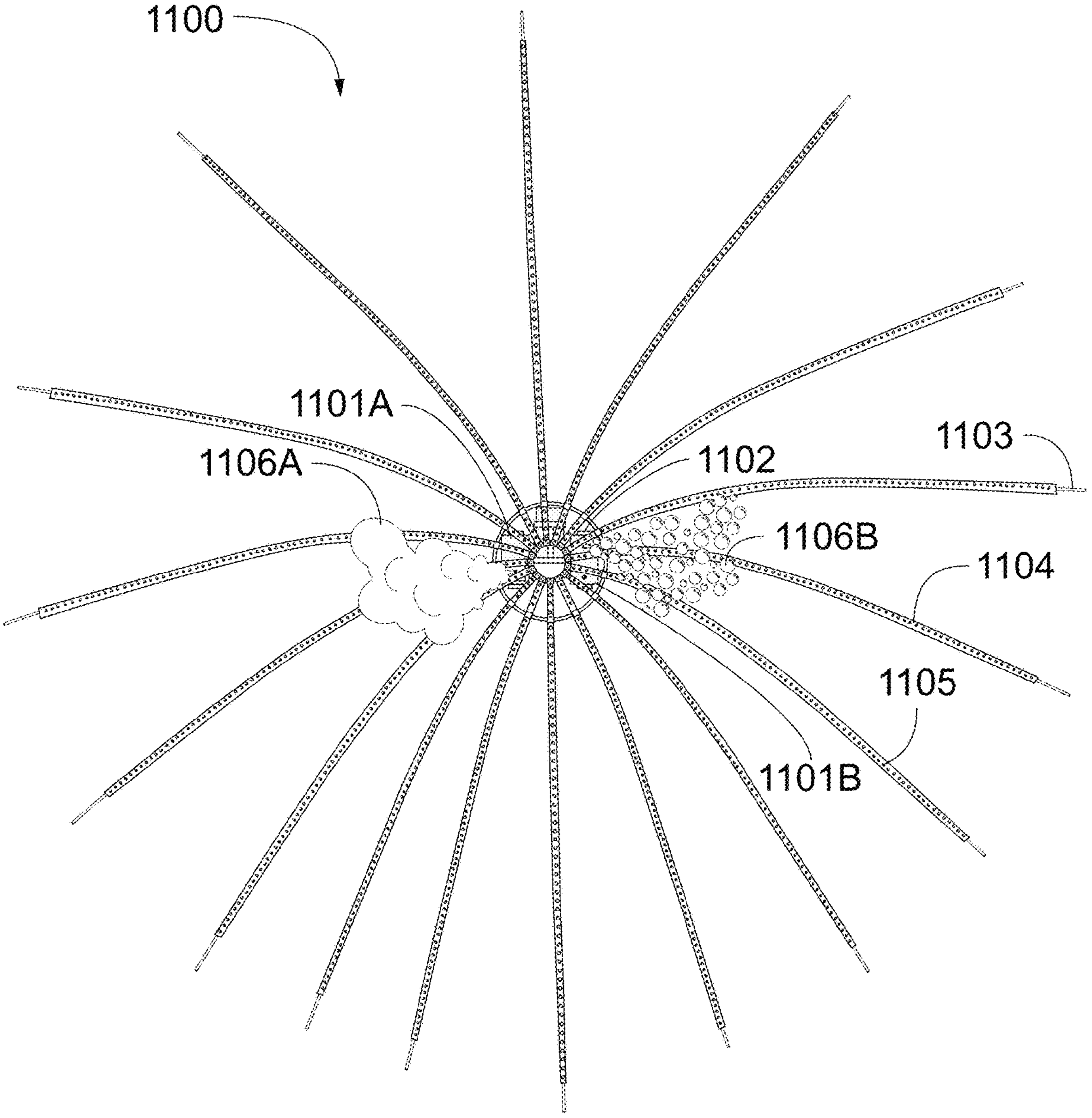
FIG. 7 illustrates a fifth embodiment according to aspects of the present disclosure; here an LED fireworks apparatus with no center fixture (instead including apparatus for positionally affixing and directionally orienting one or more devices to provide transient sensory-type effects) and radially extending arms, each of which includes some number of LEDs generally in a linear array.

A first embodiment (hereinafter “Embodiment 1”) in accordance with at least one aspect of the present disclosure envisions an LED fireworks apparatus 700 with a center burst LED lighting fixture and radially extending arms, each of which includes some number of LEDs generally in a linear array; see FIG. 3. As can be seen, center fixture 701 is affixed to a portion 702 of the aforementioned customized support structure assembly (FIGS. 8-11B, later discussed) and generally comprises a plurality of LEDs with a single light directing device (here, a secondary lens) so to produce a generally intense, concentrated at the center of the apparatus which is controllable in terms of intensity and color wirelessly—for example, model SMART+ WIFI Flood 30W available from LEDVANCE GmbH, Garching, Germany—though a diffuser material could be added to provide a more diffuse light, if desired. Also affixed to the customized support structure assembly and extending radially and outwardly from center fixture 701 are a plurality (here, nine) of arms 703 (e.g., ASTM A519 grade 1026 carbon steel, ⅛ inch thick, 1 inch ID tubing creating a lit diameter of roughly 6 feet across apparatus 700); the finish is chosen so arms 703 do not compete with the lighting effects, the material is chosen for its resistance to wind load and ability to support LED lighting fixtures (discussed in other embodiments), and the length is chosen because it is long enough to cause an arching or draping of arms 703 in situ (e.g., when lifted 100+ feet) which more closely emulates a traditional fireworks show than if arms 703 were rigid and essentially linear when elevated, though, of course, this could differ.

Affixed (e.g., via cable tie) to arms 703 are positioning members 704 (e.g., blackened polycarbonate sheet) with holes sized to resiliently restrain, positional affix in situ, and directionally orient LEDs 705 (here, each having an internal driver to reduce the amount of wiring 706 traveling back down to mobility means 200); for example, any model of Smart Pixel LEDs available from Wire Watts, LLC, Alpharetta, Georgia, USA. As illustrated, wiring 706 connecting different runs of LEDs 705 is free hanging, but depending on the final size of apparatus 700, wind conditions, fully extended length of crane assembly 100, and the like, it may be preferable to run wiring (if such is sufficiently isolation from physical and electrical interference) inside of generally hollow arms 703.

An alternative embodiment (hereinafter “Embodiment 2”) in accordance with at least one aspect of the present disclosure envisions an LED fireworks apparatus 800 with a center burst LED lighting fixture, radially extending arms with no LEDs thereupon, and one or more LED lighting fixtures affixed at a distal end and/or intermediate length of said arms for additional theatrical effects. Here, center fixture 801 is affixed to portion 802 of the aforementioned customized support structure assembly (FIGS. 8-11B, later discussed) and generally comprises a plurality of RGB LEDs (here, approximately 300 model XM-L color LEDs available from CreeLED, Inc., Durham, North Carolina, USA) each of which includes a light directing device (here, narrow beam secondary lenses produced in-house, though there are many commercially available optics vendors). The same or similar LED lighting fixtures 805 are installed at one or more intermediate or distal positions on arms 803A/803B; by way of example and not by way of limitation, one arm 803A/803B is illustrated with both an intermediate fixture 805D and a distal fixture 805A, one arm 803A/803B is illustrated with only an intermediate fixture 805C, and several arms 803A/803B are illustrated with only a distal fixture 805B. In practice, because there are more total arms (here, sixteen) and LED fixtures 805 are much larger and heavier than individual LEDs 705 of Embodiment 1, and because the total lit diameter is greater than in Embodiment 1 (here, approximately 60 feet across apparatus 800), it is likely at least a portion of the radially extending arms (here, portion 803A) needs to be more substantial or rigid than portion 803B; for example, portion 803A may be ¾ inch thick ASTM A519 grade 1026 carbon steel tubing as opposed to ⅛ inch thick tubing in portion 803B (which is comparable to part 703 of Embodiment 1, but much longer).

An alternative embodiment (hereinafter "Embodiment 3") in accordance with at least one aspect of the present disclosure envisions an LED fireworks apparatus 900 with a center burst LED lighting fixture, radially extending arms with no LEDs thereupon, with perforations in said arms such that light from one or more laser devices contained in said arms extends outwardly from the apparatus for additional theatrical effects. Here, center fixture 901 is of the same or similar design to that of center fixture 801 in Embodiment 2; likewise, portion 902 is the same or similar to portion 802 of Embodiment 2, and substantial/rigid arm portion 903A is similar to portion 803A of Embodiment 2. As previously described for parts 703 and 803A/B, parts 903A are predominantly hollow—which allows for insertion of a laser device visible to persons dozens or more feet away yet not so intense as to be dangerous (see, for example, laser devices used in U.S. Pat. No. 7,500,764 incorporated by reference herein) such that laser light 905 projects through perforations in portion 903B to create a safely viewed lighting effect.

An alternative embodiment (hereinafter "Embodiment 4") in accordance with at least one aspect of the present disclosure envisions an LED fireworks apparatus 1000 with a center ultraviolet (UV) LED lighting fixture 1001 (i.e., light emitted is at least significantly in the UV range rather than significantly in the visible range as in other embodiments) and radially extending arms, each of which includes some manner of UV-activated material (e.g., decals, paint) designed to provide theatrical effects when the center fixture is energized. Here center fixture 1001 (e.g., DragonX model YR-P0354SUV available from Lighting Geek Entertainment Inc., Richmond, Canada) is affixed to portion 1002 (which is the same or similar to portions 702, 802, and 902 of the previous embodiments) and provides an enhanced theatrical experience when parts 1005 of arm portions 1003A and/or 1003B (which are the same or similar to arm portions 803A/B of Embodiment 2) fluoresce when center fixture 1001 is energized.

An alternative embodiment (hereinafter "Embodiment 5") in accordance with at least one aspect of the present disclosure envisions an LED fireworks apparatus 1100 with no center fixture (instead including apparatus for positionally affixing and directionally orienting one or more devices to provide transient sensory-type effects) and radially extending arms, each of which includes some number of LEDs generally in a linear array. Here, LED fireworks apparatus 1100 is affixed to portion 1102 (which is the same or similar to portions 702, 802, 902, and 1002 of the previous embodiments) but instead of a center fixture, the center space of the apparatus has additional structure (e.g., steel brackets) for mounting a smoke machine 1101A (e.g., model Fog Fury Jett available from ADJ Products, LLC, Los Angeles, California, USA) and a bubble machine 1101B (e.g., model Fobbles F4 available from Froggy's Fog, Columbia, Tennessee, USA) adapted to produce transient sensory-type effects. If desired, smoke 1106A from part 1101A could be synced with LEDs 1105 so to better emulate a traditional fireworks show. Alternatively, or additionally, bubble solution used for bubbles 1106B from part 1101B could include a phosphorescent or UV dye (e.g., model Tekno Bubbles also available from Froggy's Fog) to provide an enhanced theatrical experience; though it is of note this might require a different set or subset of LEDs 1105 emitting in a different range (e.g., 400 nm) to yield the greatest impact. Other parts 1103, 1104, and 1105 are the same or similar to parts 703, 704, and 705, respectively, of Embodiment 1—with the exception that wiring is shielded and run internal to arm 1103, and arm 1103 is much longer (here, a lit diameter similar to Embodiment 2).

All of the aforementioned exemplary embodiments make use of a support structure assembly 1200 (FIG. 8) which provides (i) gripping surfaces for custom crane jib assembly 500 (see FIGS. 11A and B), (ii) means for mounting LED fireworks apparatus components (see FIGS. 9A-E), and (iii) means for resiliently restraining radially extending arms (and any part contained therein or affixed thereto) yet allowing for the more naturally looking arching/draping (see FIGS. 10A-D).

As can be seen from FIGS. 8, 22, and 9A-E, center support subassembly 1210 generally comprises an outer perimeter portion 1212 on the order of 8 feet in diameter—which correlates to parts 802, 902, 1002, and 1102 of Embodiments 2-5—and an inner perimeter portion 1218 on the order of 2 feet in diameter—which correlates to part 702 of Embodiment 1—with strengthening ribs 1217 therebetween; as envisioned, parts 1212, 1213, 1217, and 1218 are formed from 1×1×0.12 P&O ASTM A513 grade square tubing available from a number of commercially available sources, though this could differ. Center support subassembly 1210 further comprises a number of annular members 1214 on outer perimeter portion 1212 and annular members 1215 on inner perimeter portion 1218 each of which positionally affixes a radially extending arm when a threaded bolt is tightened against said arm (see FIG. 10D). Center support subassembly 1210 further comprises members 1213 each of which (i) interposes annular member pairs 1214/1215, (ii) is run in a perpendicular direction to pairs 1214/1215, and (iii) is adapted with double eyelets on both ends for said resilient restraining means (later discussed).

Figure 8:
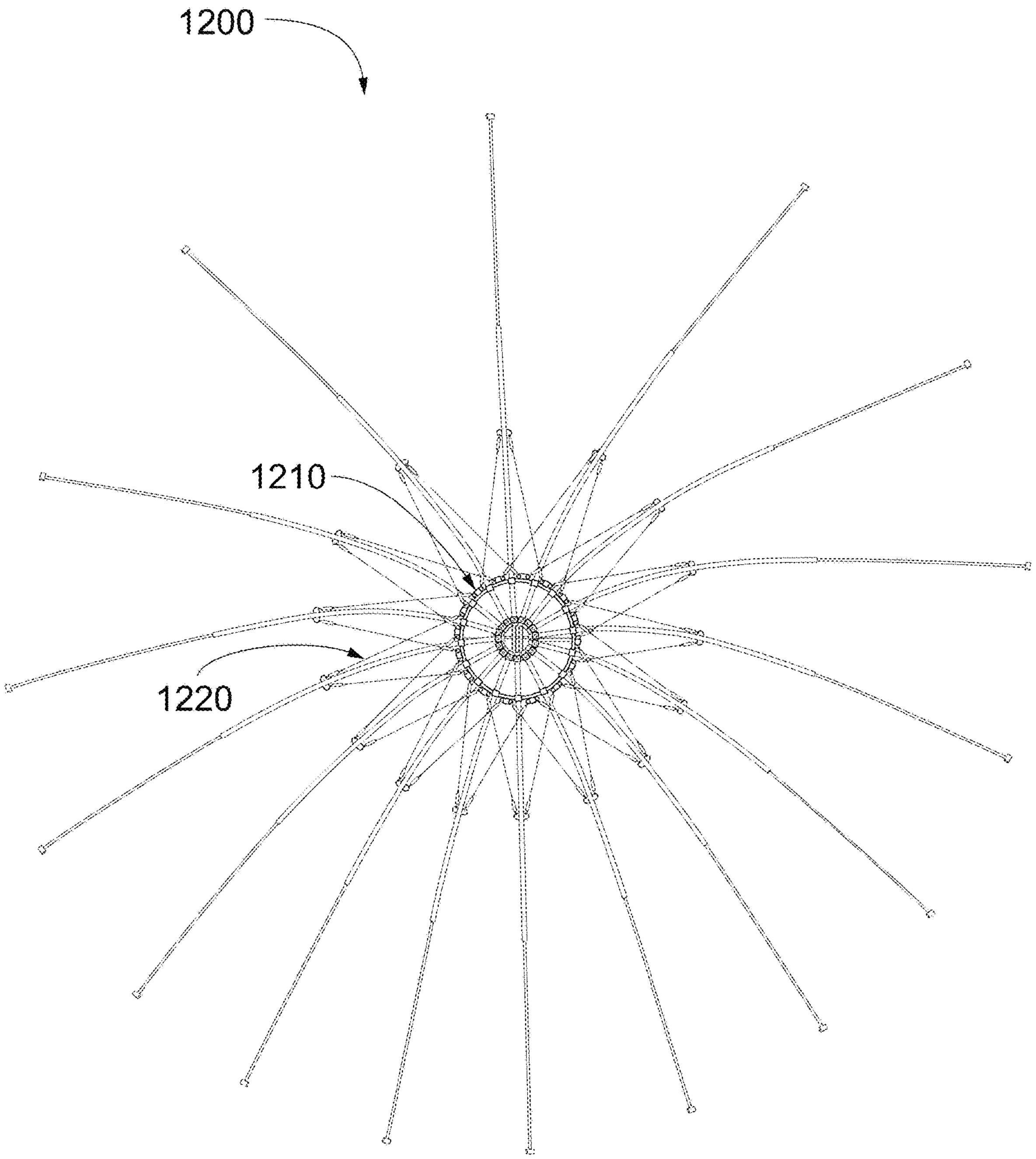
FIG. 8 illustrates a support structure assembly which could be used with any of the aforementioned embodiments according to aspects of the present disclosure.
Figure 9A:
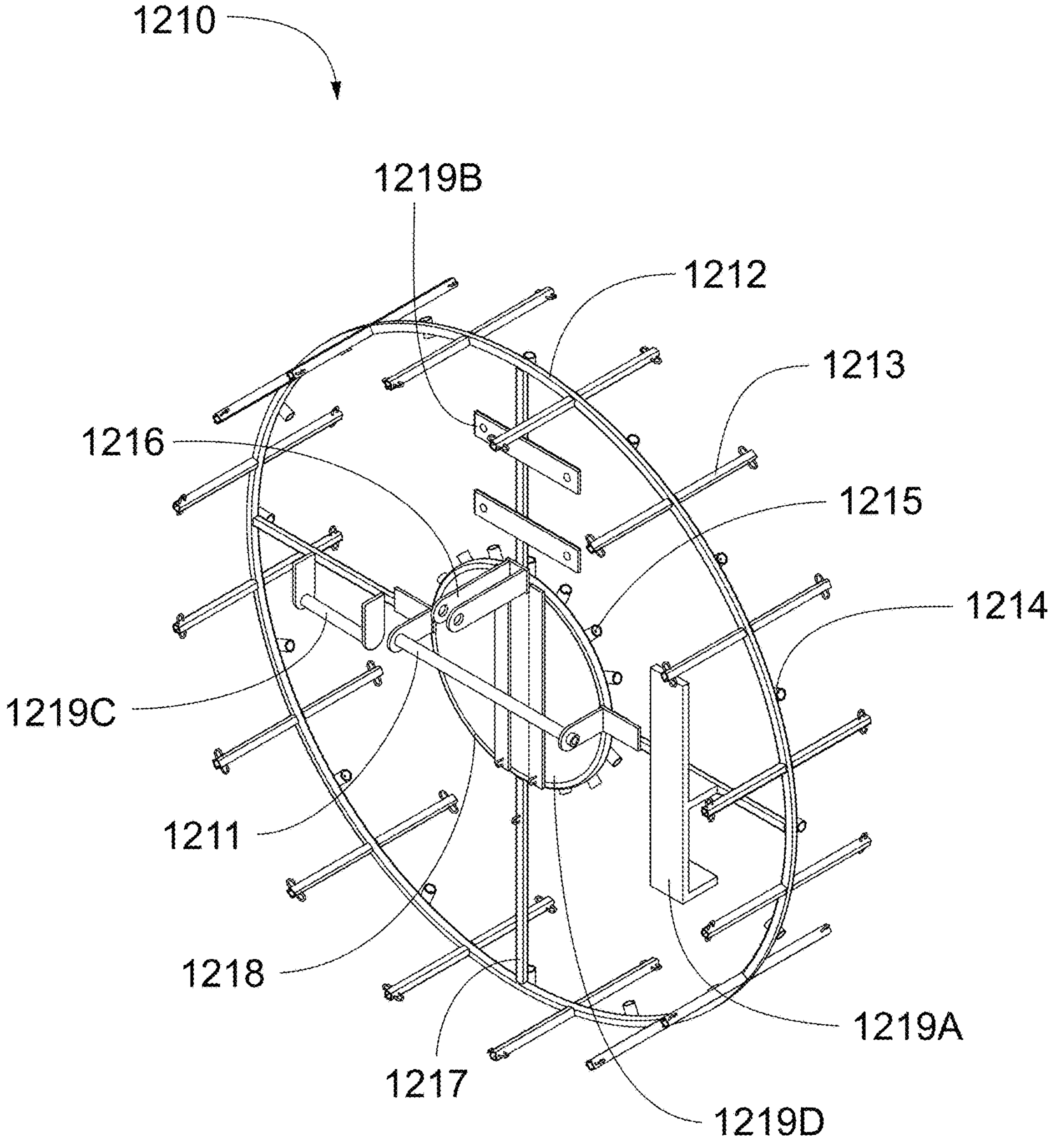
FIGS. 9A-E illustrate various views of a center support subassembly of the support structure assembly of FIG. 8.
Figure 9B:
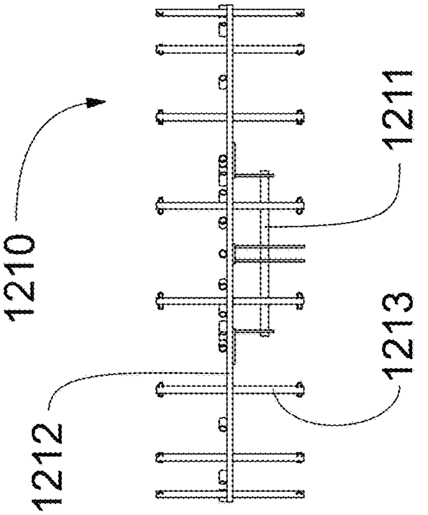
Figure 9E:
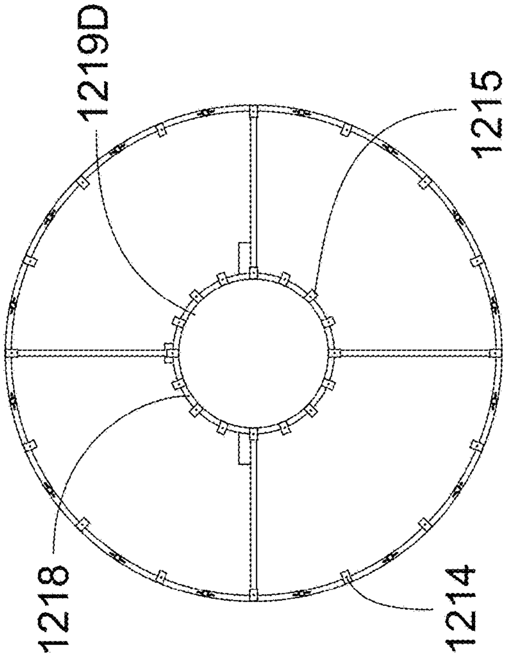
Figure 9D:
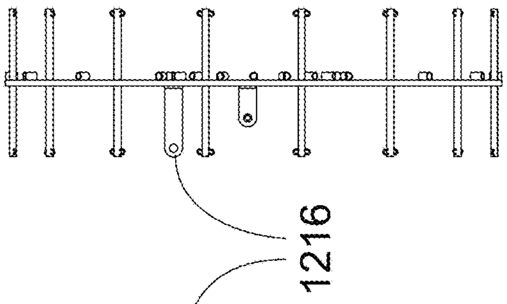
Figure 9C:
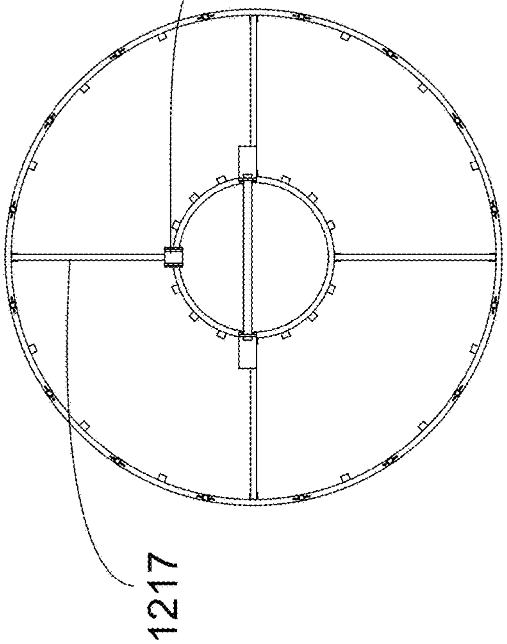

As can also be seen from FIGS. 8, 22, and 9A, center support subassembly 1210 further comprises some number of mounting interfaces 1219A-D any of which may be better suited than another for the various apparatuses and devices needed to produce the lighting and transient sensory-type effects previously described and later illustrated; note that for clarity only part 1219D is illustrated in FIGS. 9B-E. For example, mounting interface 1219D is a round aluminum plate-type interface—which is well suited for center LED fixtures (and would serve as an effective heat sink). Shelf-like mounting interface 1219A may be best suited for oddly shaped devices such as bubble machines, smoke/fog machines, cold spark machines, or air cannons (later discussed). Bracket-like mounting interfaces 1219B may be well suited for heavy parts—for example, enclosures which house controllers (e.g., any model of pixel controller available from HolidayCoro, Houston, Texas, USA), power supplies (e.g., 12V power supplies also available from HolidayCoro), fans (as are available from a number of commercial sources), and associated wiring and connectors for control and programming of any of the aforementioned (e.g., any model of XConnect connector from aforementioned Wired Watts and any model of DMX wiring, Ethernet wiring, or other wiring capable of carrying e.g., SPI data using WS2811 pixel protocol). Mounting interface type 1219C may be best suited for apparatuses that need to rotate freely or are mounted in a non-standard orientation (e.g., via clamps).

Lastly, center support subassembly 1210 further comprises a portion 1211 and a portion 1216 which are adapted for being gripped and pivoted by custom jib assembly 500, respectively. As can be seen from FIG. 11A, custom jib assembly 500 includes a hydraulically operated portion 502 which, in response to a control (e.g., at the bed of mobility means 200), pivots subassembly 1210 (e.g., on the order of 20 degrees upward or downward with respect to an axis extending along the length of part 1211) when part 502 is pivotably secured (e.g., via bolt and nut combination) to part 1216. A main jib body 501 includes hooks 504 at the distal end to grip and clamp down on part 1211 so to positionally affix and orient subassembly 1210 when lifted without pinching or interfering with what will be referred to as an umbilical cord 503, so called since it may employ one or more cords to supply power, communication, etc. In some embodiments of the present disclosure, these cords may not be inside a single umbilical cord but may be separate cords.

While the precise composition of umbilical cord 503 will differ depending on the needs of the application, devices mounted to support structure assembly 1200, need for electrical shielding to avoid impacting control signals, or anticipated wind loading, for example, umbilical cord 503 will generally comprise in one or more bundles (i) wiring for Ethernet, DMX, E1.31, or any combination thereof; (ii) power supply wiring for one or more strings of LEDs and/or LED lighting fixtures; and (iii) a lightweight support line or cable (e.g., ½ inch DYNEEMA® performance rope available from Koninklijke DSM N.V., Heerlen, Netherlands) to better ensure safe operation, correct orientation in situ, and prevent twisting of parts when elevated.

Figure 11A:
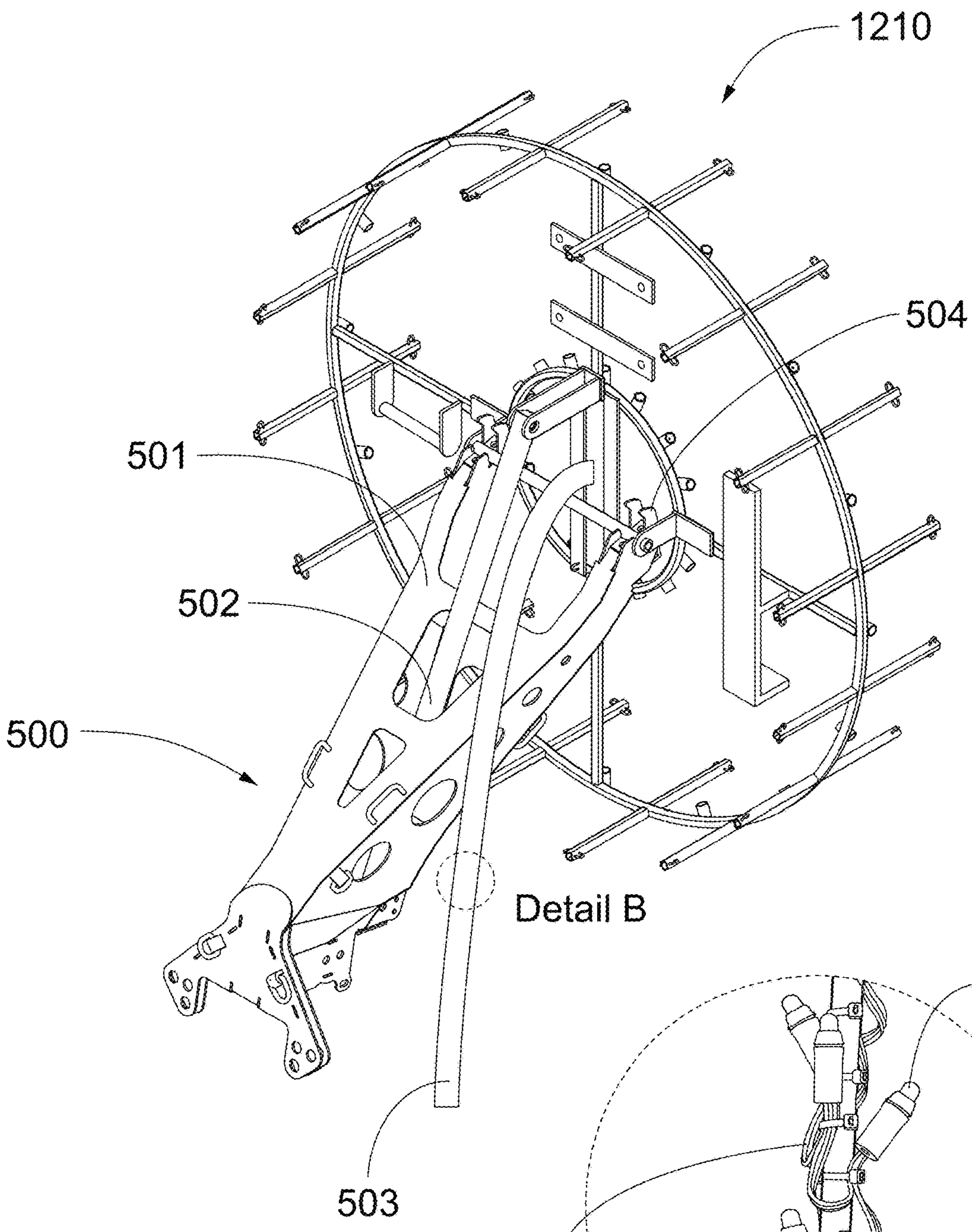
FIGS. 11A and B illustrate how the various apparatuses of the aforementioned embodiments are wired, positionally affixed in situ, and directionally oriented in the manner illustrated in FIG. 2.
Figure 11B:
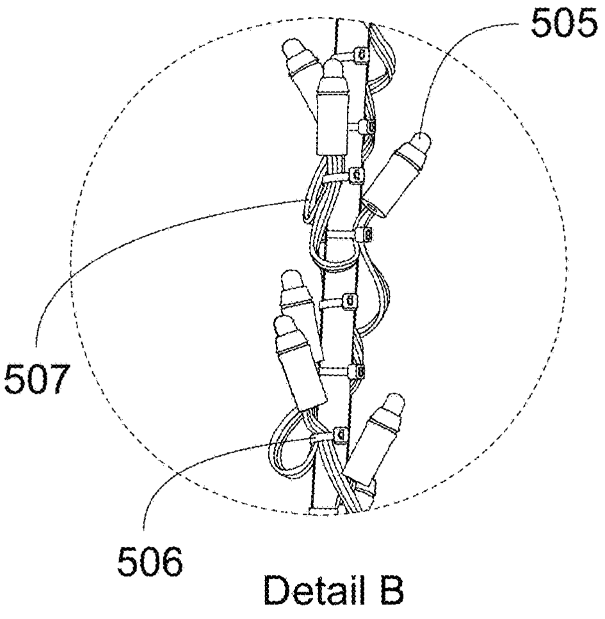
FIG. 11B illustrates Detail B of FIG. 11A.

It is also of note that the presence of an umbilical cord 503 presents a unique opportunity for additional lighting effects; this is illustrated in FIG. 11B. Here, LEDs 505 (which may be the same or similar to integral driver LEDs 705 and 1105) together with their wiring 507 are spiral-wrapped and secured via cable tie 506 at approximately 1 inch increments across the total length of umbilical cord 503; here, approximately 160 feet, though this depends on both the total extended length capacity of crane assembly 100 and limitations on data communication using the aforementioned means and protocol. Having LEDs leading from the ground up to any of Embodiments 1-5 (and vice versa) allows for an enhanced theatrical experience that more closely emulates a traditional fireworks show insomuch that tail effects can be produced (later discussed).

Figure 10A:
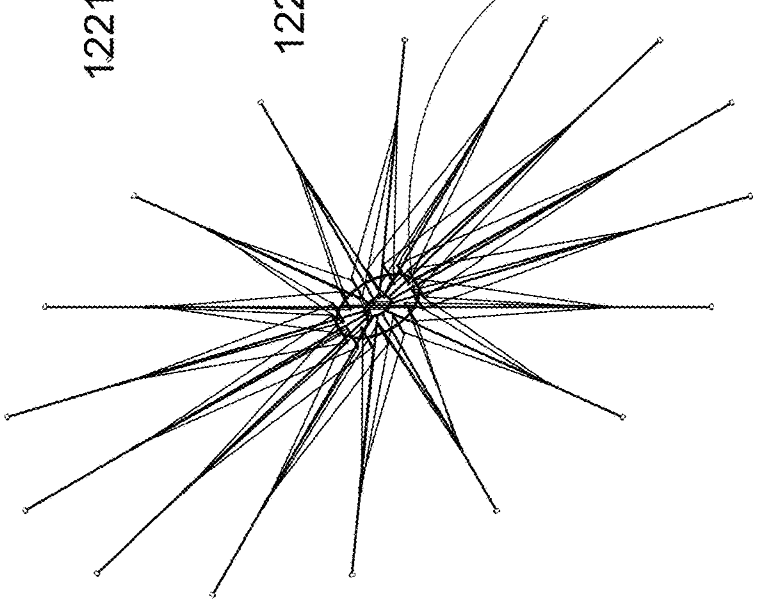
FIGS. 10A-D illustrate various views of a resilient member subassembly of the support structure assembly of FIG. 8.
Figure 10B:
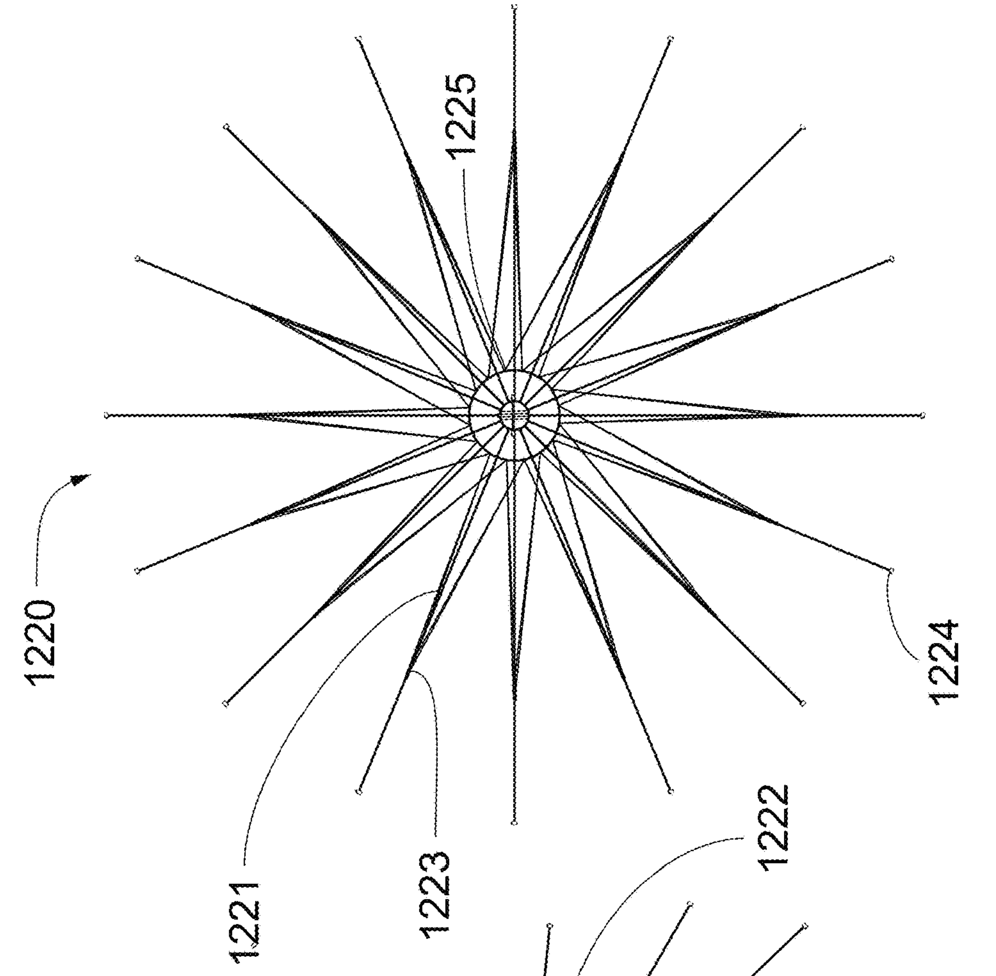
Figure 10C:
Figure 10D:
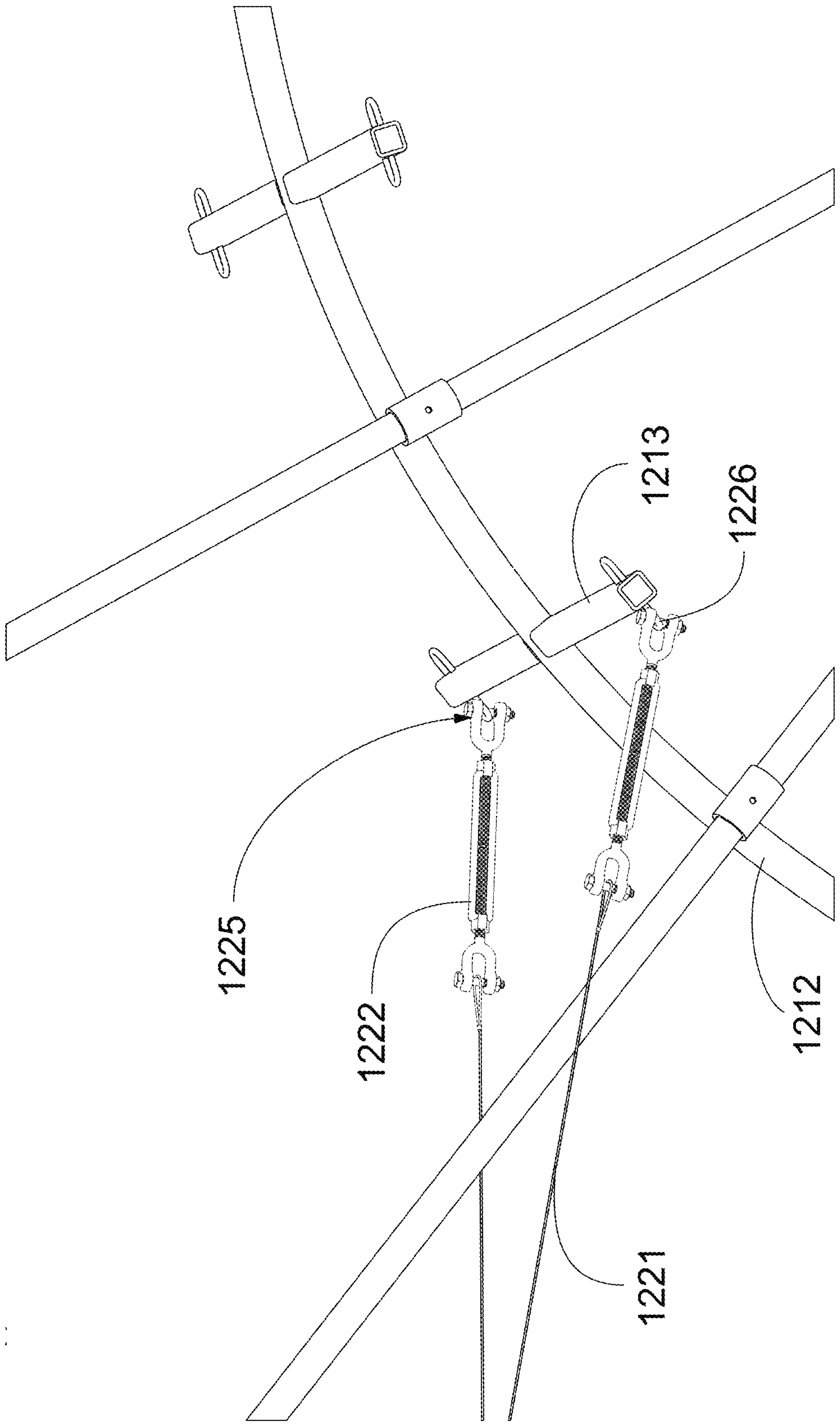

The other important subassembly which forms a part of support structure assembly 1200 is a resilient member subassembly 1220; see FIGS. 8, 22, and 10A-D. Here, resilient member subassembly 1220 includes a plurality of cables 1221 (e.g., stainless steel, 1×7 strand, 1/16 inch aircraft cable available from Fortune Rope, Bristol, Rhode Island, USA) with associated fastening devices; FIGS. 10A-C shows cables 1221 as they exist in situ with parts 1212 and 1218 (not labeled) overlaid for context. Each cable is secured to center support subassembly 1210 at a proximate end 1225 via a removable fastening device 1226 (here, a threaded nut and bolt combination) inserted through an eyelet of part 1213. This type of connection is repeated for one or two locations at each radially extending arm, at an intermediate connection point 1223, at a distal connection point 1224, or at both an intermediate and distal connection points 1223/1224. In this sense, radial extending arms 703, 803A/B, 903A/B, 1003A/B, and 1103 may have one or two sets of double eyelets along their length to establish the connection illustrated at point 1225 in FIG. 10D, though it is of note that eyelets are not illustrated in FIGS. 3-7. Lastly, to achieve a desired level of tension, support, and/or natural drape, an adjustable device 1222 (e.g., any model of stainless steel jaw & jaw turnbuckle available from US Cargo Control, Urbana, Iowa, USA) is included at least at proximate connection point 1225.

Figure 2:
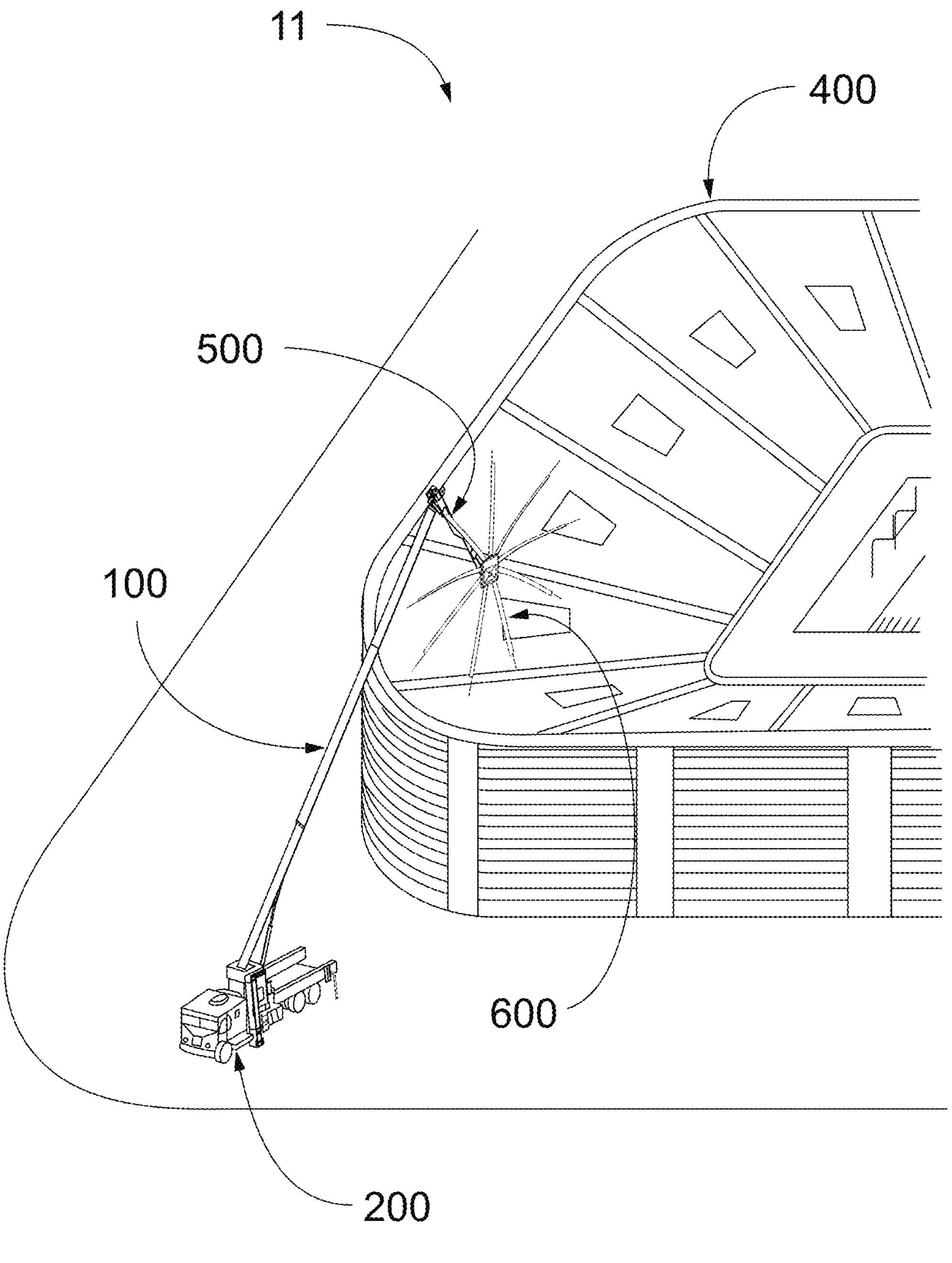
FIG. 2 illustrates FIG. 1 as modified according to aspects of the present disclosure.
Figure 16:
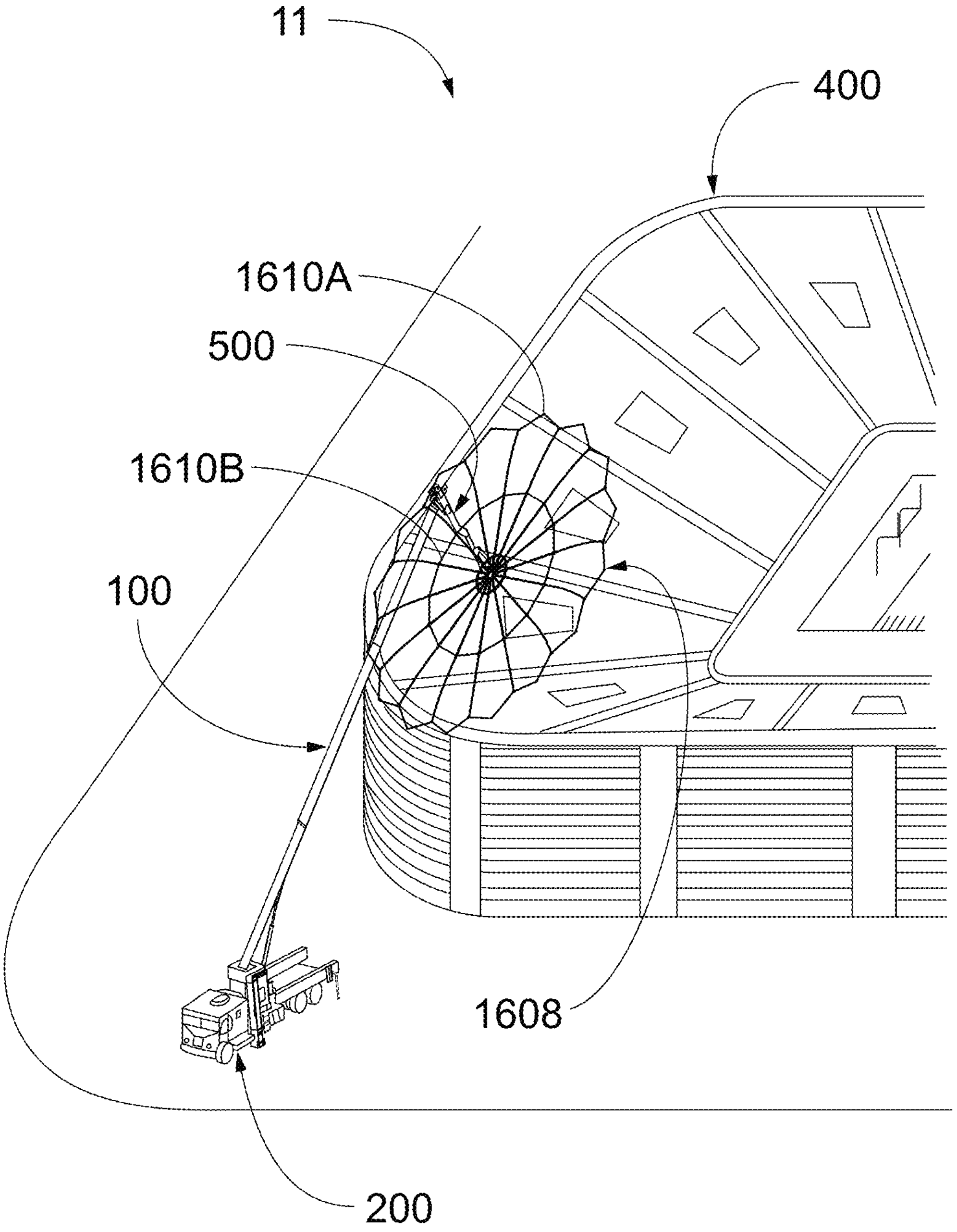
FIG. 16 illustrates FIG. 1 as modified according to aspects of the present disclosure.

FIG. 16 illustrates FIG. 1 as modified according to aspects of the present disclosure. The example of FIG. 16 is similar to the example of FIG. 2, with the inclusion of support ring 1610A (may also be referred to a stabilizer ring) and support ring 1610B (may also be referred to as a stabilizer ring, which each include support beams connected by one or more of hinges 1608. Otherwise, mobility means 200 and crane assembly 100 are predominantly the same as in FIG. 1, but lighting assembly 300 has been replaced with an assembly or LED fireworks apparatus 1700, 1800, 1900, etc. of any number or combination of apparatuses together with said customized support structure assembly is gripped, positionally affixed in situ, and directionally oriented by a custom crane jib assembly 500. Several non-limiting, specific examples of apparatuses which can be used in mobile lighting system 11 are presently discussed. However, it should be noted that no extended arm may be needed in some embodiments of the present disclosure. In fact, a custom crane jib or a crane in general may not be needed in various embodiments of the present disclosure. For example, the fireworks apparatus may be permanently installed on top of the roof of a stadium or a ballpark, etc.

Figure 17:
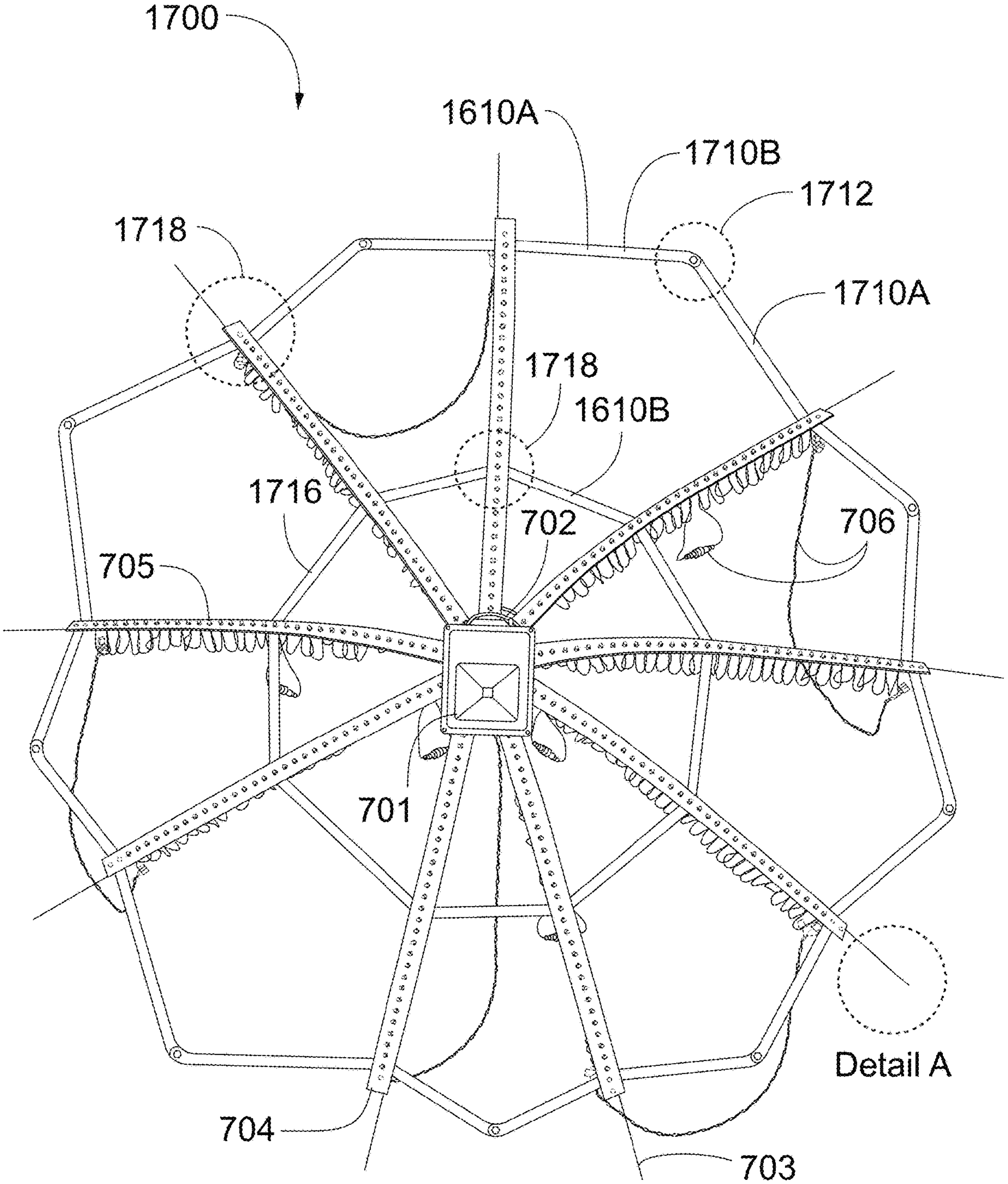
FIG. 17 illustrates a sixth embodiment according to aspects of the present disclosure that is similarly or identically configured as the embodiment of FIG. 3 except that the sixth embodiment includes a radially intermediate ring of stabilizers and a radially outer ring of stabilizers.

A sixth embodiment (hereinafter "Embodiment 6") in accordance with at least one aspect of the present disclosure envisions an LED fireworks apparatus 1700 with a center burst LED lighting fixture and radially extending arms, each of which includes some number of LEDs generally in a linear array; see FIG. 17. FIG. 17 illustrates a sixth embodiment according to aspects of the present disclosure; here an LED fireworks apparatus with a center burst LED lighting fixture and radially extending arms, each of which includes some number of LEDs generally in a linear array. As can be seen, center fixture 701 is affixed to a portion 702 of the aforementioned customized support structure assembly (FIGS. 8-11B and 22, later discussed) and generally comprises a plurality of LEDs with a single light directing device (here, a secondary lens) so to produce a generally intense, concentrated at the center of the apparatus which is controllable in terms of intensity and color wirelessly—for example, model SMART+ WIFI Flood 30W available from LEDVANCE GmbH, Garching, Germany—though a diffuser material could be added to provide a more diffuse light, if desired. Also affixed to the customized support structure assembly and extending radially and outwardly from center fixture 701 are a plurality (here, nine) of arms 703 (e.g., ASTM A519 grade 1026 carbon steel, ⅛ inch thick, 1 inch ID tubing creating a lit diameter of roughly 6 feet across apparatus 700); the finish is chosen so arms 703 do not compete with the lighting effects, the material is chosen for its resistance to wind load and ability to support LED lighting fixtures (discussed in other embodiments), and the length is chosen because it is long enough to cause an arching or draping of arms 703 in situ (e.g., when lifted 100+ feet) which more closely emulates a traditional fireworks show than if arms 703 were rigid and essentially linear when elevated, though, of course, this could differ.

Affixed (e.g., via cable tie) to arms 703 are positioning members 704 (e.g., blackened polycarbonate sheet) with holes sized to resiliently restrain, positional affix in situ, and directionally orient LEDs 705 (here, each having an internal driver to reduce the amount of wiring 706 traveling back down to mobility means 200); for example, any model of Smart Pixel LEDs available from Wire Watts, LLC, Alpharetta, Georgia., USA. As illustrated, wiring 706 connecting different runs of LEDs 705 is free hanging, but depending on the final size of apparatus 700, wind conditions, fully extended length of crane assembly 100, and the like, it may be preferable to run wiring (if such is sufficiently isolation from physical and electrical interference) inside of generally hollow arms 703.

Additionally, Embodiment 6 includes additional support structures for each of arms 703. These support structures include outer support ring 1610A and inner support ring 1610B. Outer support ring 1610A includes a number of support beam portions, including support beam portion 1710A and 1710B (collectively, support beam portions 1710). Support beam structures 1710 may be connected to one another via one or more hinges, such as hinge 1712. This may enable outer support ring 1610A to have more rigid support structures for the relatively unstable arms 703, while still allowing the system to collapse for transportation. The long, light nature of arms 703, along with their placement high in the air, may lead to swaying or general instability of structure 1700. Additionally, the further away from the center of the structure arms 703 are, the more susceptible that portion of arms 703 are for swaying and instability. Placing outer support ring 1610A and support beam structures 1710, which may be made of steel, plastic, aluminum, fiberglass, or any other rigid and lightweight material that effectively provides support to arms 703, with support beam structures 1710 being either solid or hollow beams.

In some instances, in addition to being connected by hinge 1712, one of support beam structure 1710A or 1710B may disconnect from the one or arms 703 that the respective support beam structure 1710 is connected to in order to further provide ease of storage. For instance, connector 1718 may be a releasable connection structure attaching one of support beam structures 1710 to one of arms 703. While connected, support beam structure 1710 may hinge around connector 1718 and hinge 1712 to allow for rotational movement of the support beam structure around connector 1718 and hinge 1712. When being deconstructed, connector 1718 may release, such as by removing a pin or unscrewing a nut-and-bolt connector, allowing support beams structures 1710 to either be completely removed or to fold down by arms 703 for easier storage.

In some instances, it may further be beneficial to include a second support ring structure to provide further stability to arms 703. In such instances, structure 1700 may additionally include inner support ring 1610B. Inner support ring 1610B may be made of a number of support beam structures 1716, which may be constructed in a similar manner and composition as support beam structures 1710 of outer support ring 1610A. Given the shorter length of the space between arms 703 closer to the center, support beam structures 1716 may attach directly to multiple of arms 703 via connectors 1718, which may be structurally and functionally similar to connectors 1718 for support beam structures 1710 but located closer to the middle of arms 703. When being deconstructed, connector 1718 may release, such as by removing a pin or unscrewing a nut-and-bolt connector, allowing support beams structures 1716 to either be completely removed or to fold down by arms 703 for easier storage. Given the direct connection to multiple of arms 703, inner support ring 1610B may provide a more rigid system of support to structure 1700 as opposed to outer support ring 1610A.

In some instances, support rings 1610, including support rings 1610A, 1610B, 1610C (e.g., of FIG. 20), and 1610D (e.g., of FIG. 21) may also contribute to the various lighting effects provided by the fireworks systems. For instance, the various support beam structures may additionally include LED lights along the body to provide additional lighting effects as described elsewhere throughout this disclosure.

Figure 18:
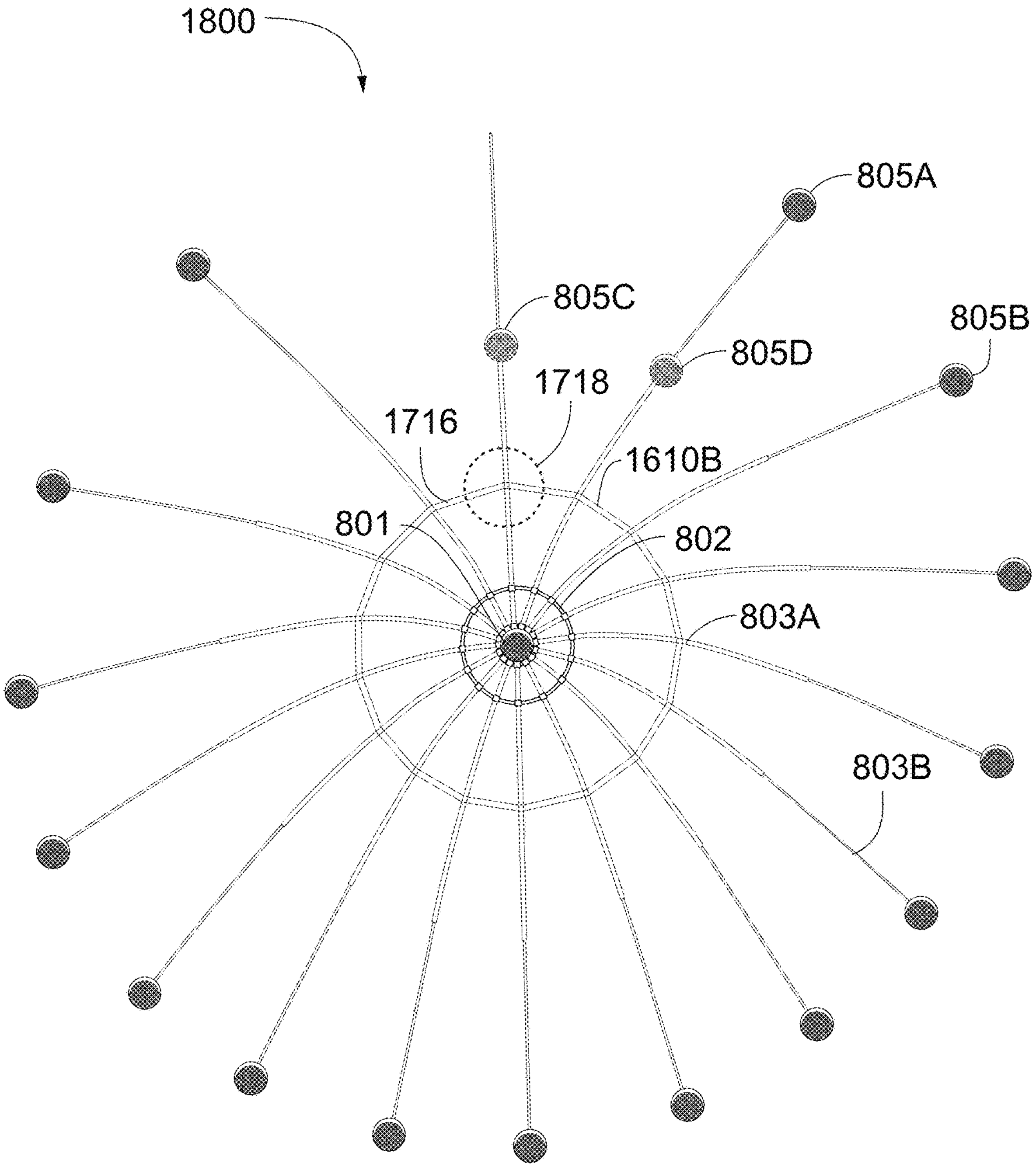
FIG. 18 illustrates a seventh embodiment according to aspects of the present disclosure that is similarly or identically configured as the embodiment of FIG. 4 except that the seventh embodiment includes a radially intermediate ring of stabilizers.
Figure 23:
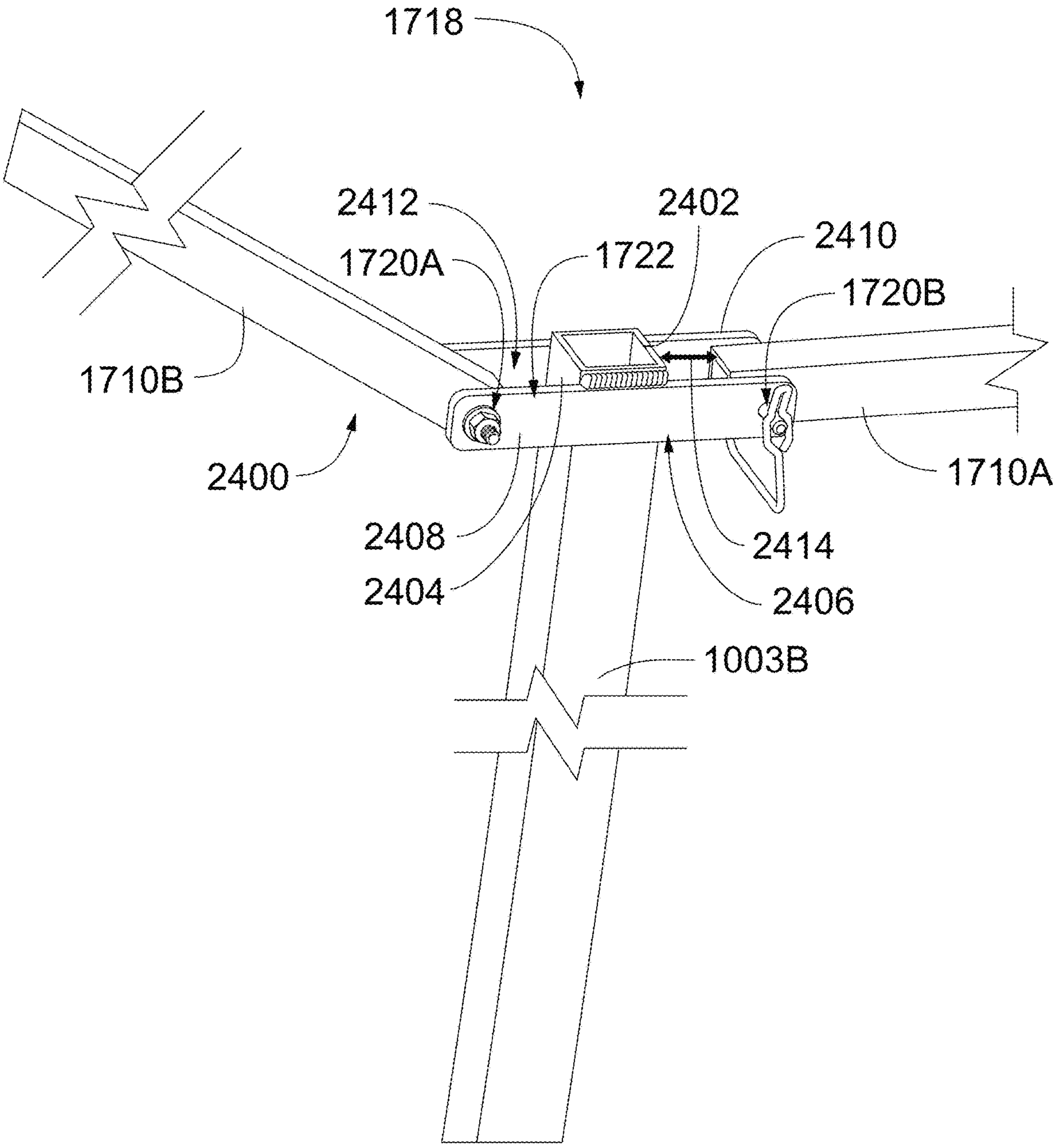
FIG. 23 illustrates a connector structure assembly and a ring support structure, which could be used with any of the aforementioned embodiments according to aspects of the present disclosure. More specifically, the interplay between the stabilizers and the arm of the fireworks apparatus provided by a slop joint is shown that allows a small amount of movement of the arm and the stabilizers.
Figure 24:
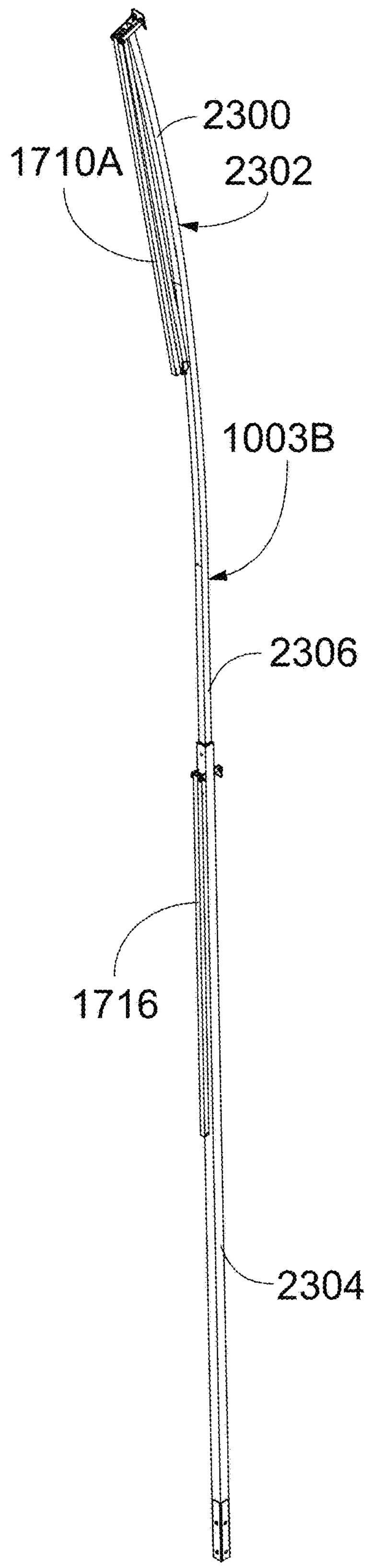
FIG. 24 illustrates an arm portion with an attached support structure which could be used with any of the aforementioned embodiments according to aspects of the present disclosure. More specifically, the stabilizers are shown in a detached stated and folded down to each transport.

An alternative embodiment (hereinafter "Embodiment 7") in accordance with at least one aspect of the present disclosure envisions an LED fireworks apparatus 1800 with a center burst LED lighting fixture, radially extending arms with no LEDs thereupon, and one or more LED lighting fixtures affixed at a distal end and/or intermediate length of said arms for additional theatrical effects; see FIG. 18. FIG. 18 illustrates a seventh embodiment according to aspects of the present disclosure; here an LED fireworks apparatus with a center burst LED lighting fixture, radially extending arms with no LEDs thereupon, and one or more LED lighting fixtures affixed at a distal end and/or intermediate length of said arms for additional theatrical bursts. Here, center fixture 801 is affixed to portion 802 of the aforementioned customized support structure assembly (FIGS. 8-11B and 22, later discussed) and generally comprises a plurality of RGB LEDs (here, approximately 300 model XM-L color LEDs available from CreeLED, Inc., Durham, North Carolina, USA) each of which includes a light directing device (here, narrow beam secondary lenses produced in-house, though there are many commercially available optics vendors). The same or similar LED lighting fixtures 805 are installed at one or more intermediate or distal positions on arms 803A/803B; by way of example and not by way of limitation, one arm 803A/803B is illustrated with both an intermediate fixture 805D and a distal fixture 805A, one arm 803A/803B is illustrated with only an intermediate fixture 805C, and several arms 803A/803B are illustrated with only a distal fixture 805B. In practice, because there are more total arms (here, sixteen) and LED fixtures 805 are much larger and heavier than individual LEDs 705 of Embodiment 1, and because the total lit diameter is greater than in Embodiment 1 (here, approximately 60 feet across apparatus 800), it is likely at least a portion of the radially extending arms (here, portion 803A) needs to be more substantial or rigid than portion 803B; for example, portion 803A may be ¾ inch thick ASTM A519 grade 1026 carbon steel tubing as opposed to ⅛ inch thick tubing in portion 803B (which is comparable to part 703 of Embodiment 6, but much longer). In other embodiments, aluminum tubing may be employed that may have a rectangular or square profile as shown in FIGS. 23 and 24.

In some examples, such as the depicted Embodiment 7, LED fireworks apparatus 1800 may only include inner support ring 1610B and not include outer support ring 1610A. In any of the Embodiments 1-10, the respective LED fireworks systems may include any combination of support rings 1610A-1610D, including any one or more of support rings 1610A-1610D alone or in any combination with one another.

Figure 19:
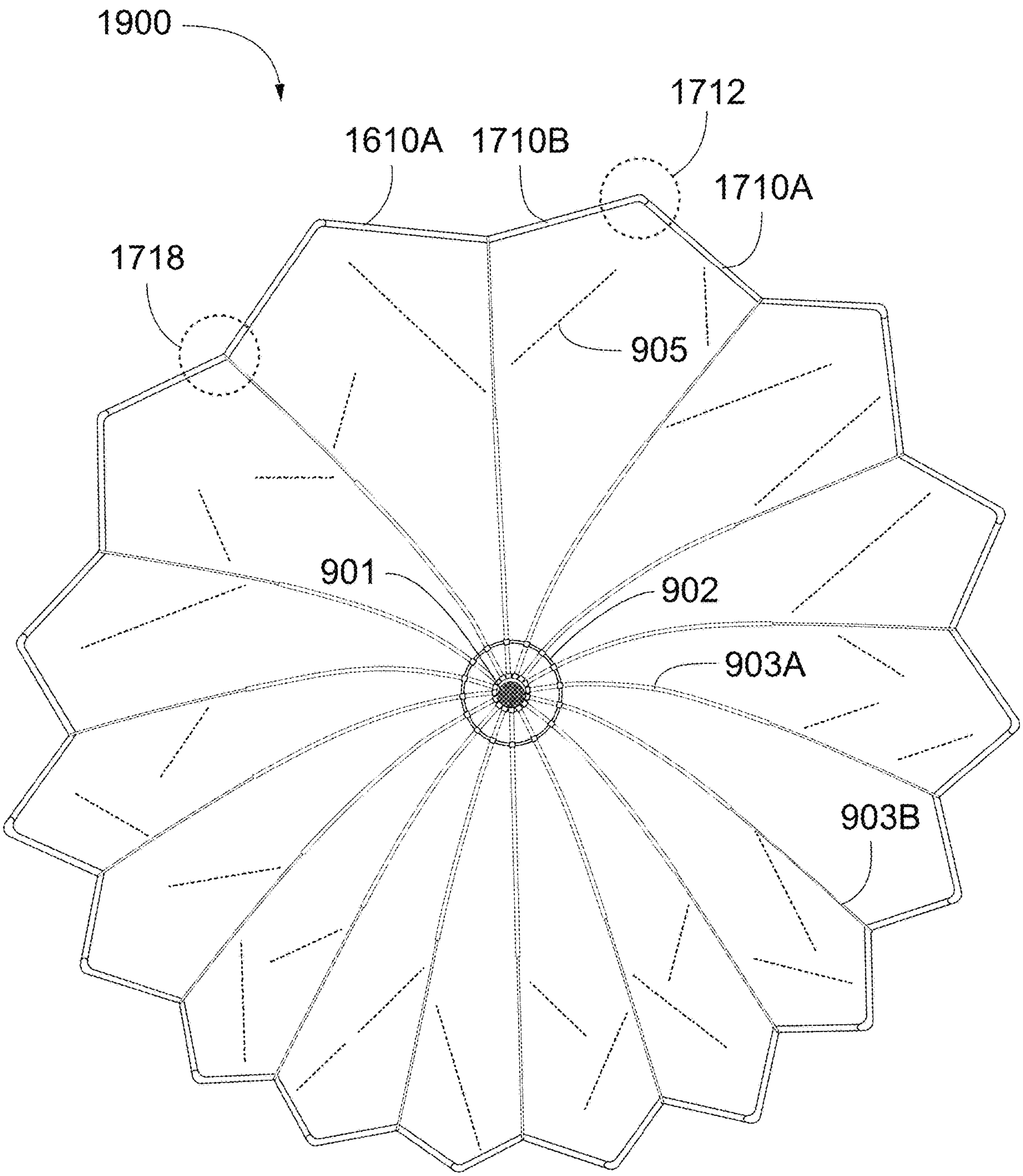
FIG. 19 illustrates an eighth embodiment according to aspects of the present disclosure that is similarly or identically configured as the embodiment of FIG. 5 except that the eighth embodiment includes a radially outer ring of stabilizers.

An alternative embodiment (hereinafter "Embodiment 8") in accordance with at least one aspect of the present disclosure envisions an LED fireworks apparatus 1900 with a center burst LED lighting fixture, radially extending arms with no LEDs thereupon, with perforations in said arms such that light from one or more laser devices contained in said arms extends outwardly from the apparatus for additional theatrical effects; see FIG. 19. FIG. 19 illustrates a third embodiment according to aspects of the present disclosure; here an LED fireworks apparatus with a center burst LED lighting fixture, radially extending arms with no LEDs thereupon, with perforations in said arms such that light from one or more laser devices contained in said arms extends outwardly from the apparatus. Here, center fixture 901 is of the same or similar design to that of center fixture 801 in Embodiment 2; likewise, portion 902 is the same or similar to portion 802 of Embodiment 2, and substantial/rigid arm portion 903A is similar to portion 803A of Embodiment 2. As previously described for parts 703 and 803A/B, parts 903A are predominantly hollow—which allows for insertion of a laser device visible to persons dozens or more feet away yet not so intense as to be dangerous (see, for example, laser devices used in U.S. Pat. No. 7,500,764 incorporated by reference herein) such that laser light 905 projects through perforations in portion 903B to create a safely viewed lighting effect.

In some examples, such as the depicted Embodiment 7, LED fireworks apparatus 1900 may only include outer support ring 1610A and not include inner support ring 1610B. In any of the Embodiments 1-10, the respective LED fireworks systems may include any combination of support rings 1610A-1610D, including any one or more of support rings 1610A-1610D alone or in any combination with one another.

Figure 20:
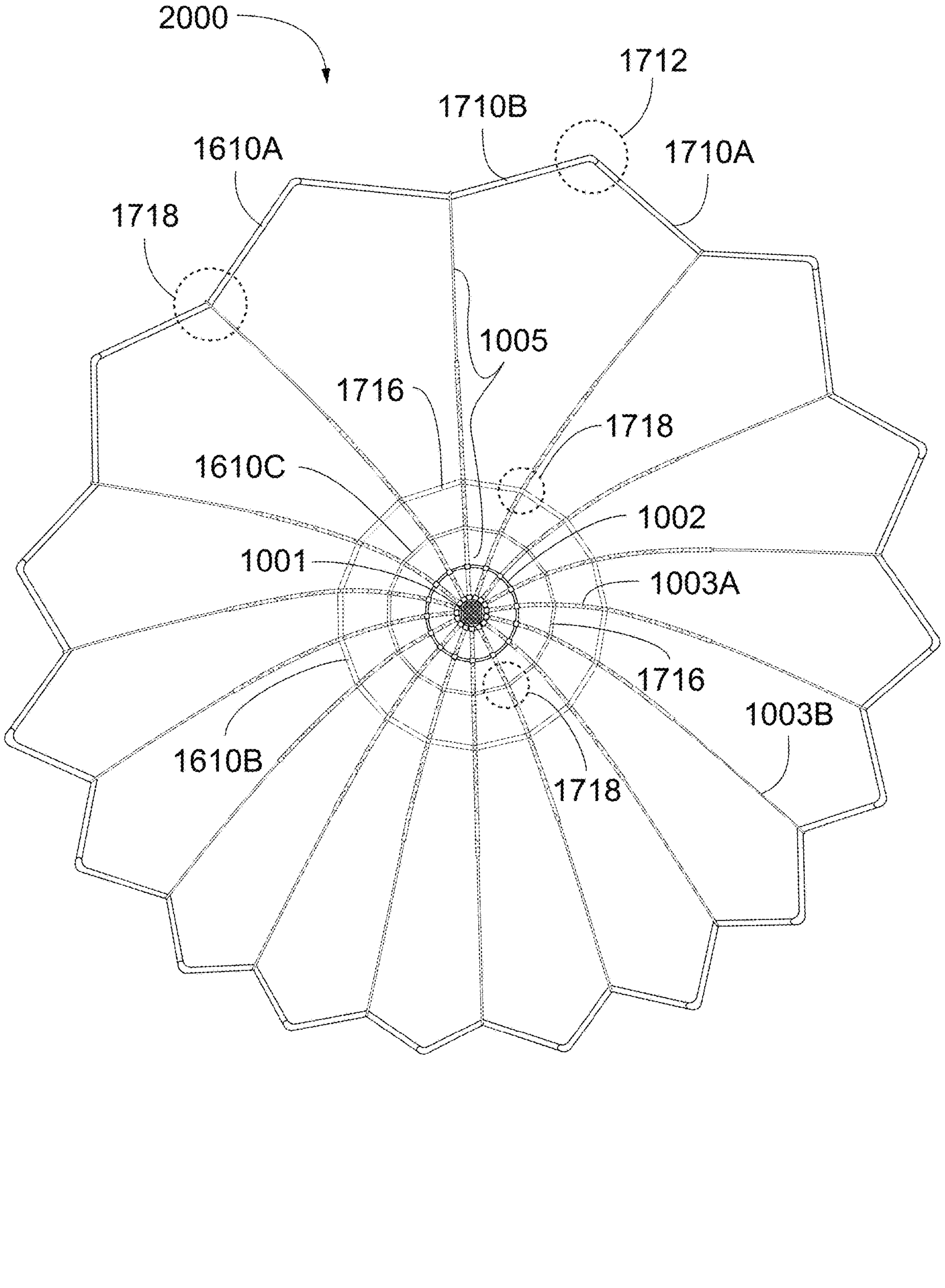
FIG. 20 illustrates a ninth embodiment according to aspects of the present disclosure that is similarly or identically configured as that of FIG. 6 except that the ninth embodiment includes a radially inner intermediate ring of stabilizers, a radially outer intermediate ring of stabilizers, and a radially outermost ring of stabilizers.

An alternative embodiment (hereinafter "Embodiment 9") in accordance with at least one aspect of the present disclosure envisions an LED fireworks apparatus 2000 with a center ultraviolet (UV) LED lighting fixture 1001 (i.e., light emitted is at least significantly in the UV range rather than significantly in the visible range as in other embodiments) and radially extending arms, each of which includes some manner of UV-activated material (e.g., decals, paint) designed to provide theatrical effects when the center fixture is energized; see FIG. 20. FIG. 20 illustrates a fourth embodiment according to aspects of the present disclosure; here an LED fireworks apparatus with a center UV LED lighting fixture (i.e., light emitted is at least significantly in the UV range rather than significantly in the visible range as in other embodiments) and radially extending arms, each of which includes some manner of UV-activated material (e.g., decals, paint) designed to provide theatrical effects when the center fixture is energized. Here center fixture 1001 (e.g., DragonX model YR-P0354SUV available from Lighting Geek Entertainment Inc., Richmond, Canada) is affixed to portion 1002 (which is the same or similar to portions 702, 802, and 902 of the previous embodiments) and provides an enhanced theatrical experience when parts 1005 of arm portions 1003A and/or 1003B (which are the same or similar to arm portions 803A/B of Embodiment 2) fluoresce when center fixture 1001 is energized.

In the example of Embodiment 9, LED fireworks system 2000 may include an additional support ring structure, e.g., center support ring 1610C. Center support ring 1610C may be similar in structure to inner support ring 1610B, with support beam structures 1716 connecting to arms 1003B via connectors 1718. In any of the Embodiments 1-10, the respective LED fireworks systems may include any combination of support rings 1610A-1610D, including any one or more of support rings 1610A-1610D alone or in any combination with one another.

Figure 21:
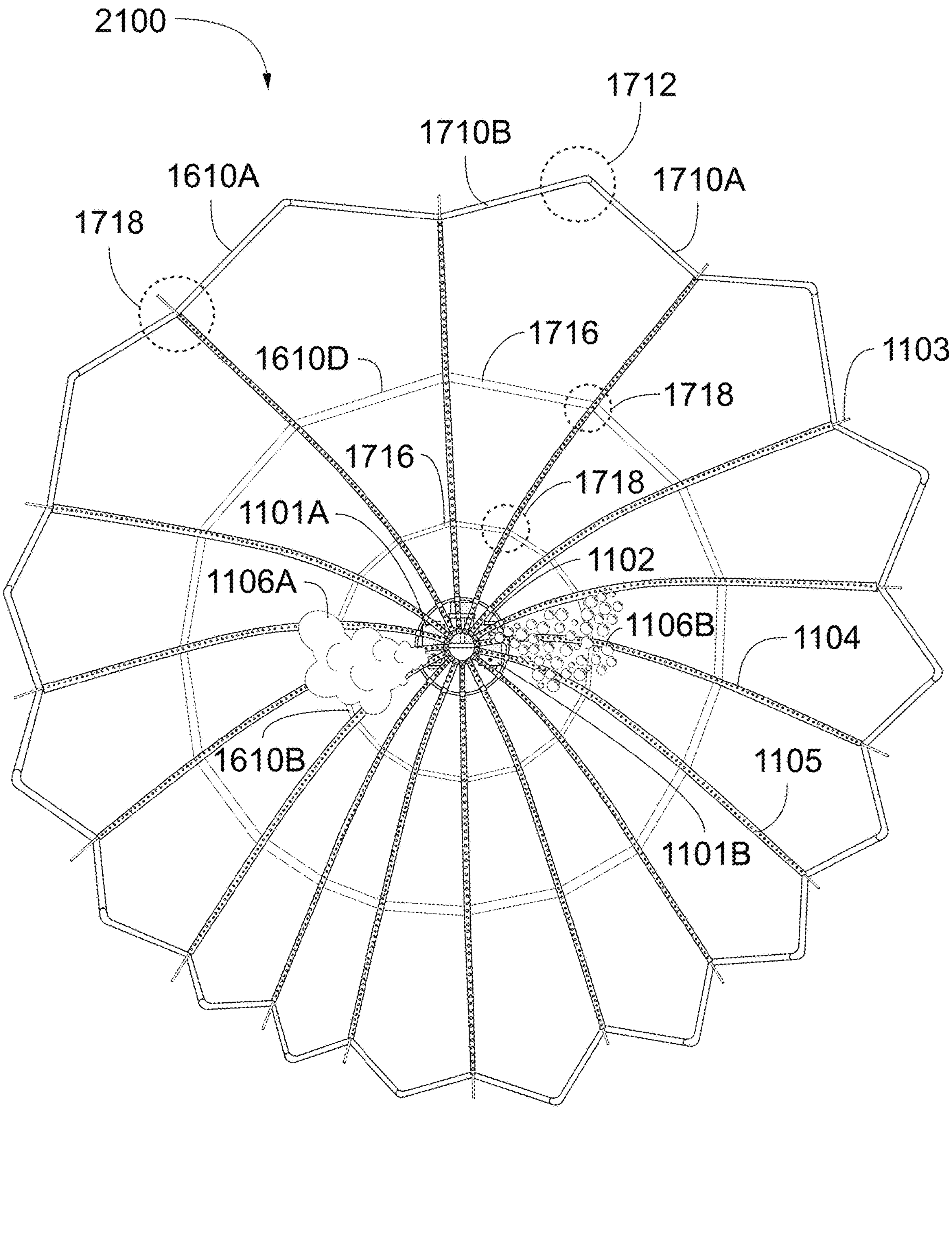
FIG. 21 illustrates a tenth embodiment according to aspects of the present disclosure that is similarly or identically configured as that of FIG. 7 except that the tenth embodiment includes a radially inner intermediate ring of stabilizers, a radially outer intermediate ring of stabilizers, and a radially outermost ring of stabilizers.

An alternative embodiment (hereinafter "Embodiment 10") in accordance with at least one aspect of the present disclosure envisions an LED fireworks apparatus 2100 with no center fixture (instead including apparatus for positionally affixing and directionally orienting one or more devices to provide transient sensory-type effects) and radially extending arms, each of which includes some number of LEDs generally in a linear array; see FIG. 21. FIG. 21 illustrates a fifth embodiment according to aspects of the present disclosure; here an LED fireworks apparatus with no center fixture (instead including apparatus for positionally affixing and directionally orienting one or more devices to provide transient sensory-type effects) and radially extending arms, each of which includes some number of LEDs generally in a linear array. Here, LED fireworks apparatus 2100 is affixed to portion 1102 (which is the same or similar to portions 702, 802, 902, and 1002 of the previous embodiments) but instead of a center fixture, the center space of the apparatus has additional structure (e.g., steel brackets) for mounting a smoke machine 1101A (e.g., model Fog Fury Jett available from ADJ Products, LLC, Los Angeles, California, USA) and a bubble machine 1101B (e.g., model Fobbles F4 available from Froggy's Fog, Columbia, Tennessee, USA) adapted to produce transient sensory-type effects. If desired, smoke 1106A from part 1101A could be synced with LEDs 1105 so to better emulate a traditional fireworks show. It should be noted that smoke and bubbles can also be used with the center fixture.

Alternatively, or additionally, bubble solution used for bubbles 1106B from part 1101B could include a phosphorescent or UV dye (e.g., model Tekno Bubbles also available from Froggy's Fog) to provide an enhanced theatrical experience; though it is of note this might require a different set or subset of LEDs 1105 emitting in a different range (e.g., 400 nm) to yield the greatest impact. Other parts 1103, 1104, and 1105 are the same or similar to parts 703, 704, and 705, respectively, of Embodiment 1—with the exception that wiring is shielded and run internal to arm 1103, and arm 1103 is much longer (here, a lit diameter similar to Embodiment 7).

In the example of Embodiment 9, LED fireworks system 2000 may include an additional support ring structure, e.g., middle support ring 1610B. Middle support ring 1610B may be similar in structure to inner support ring 1610C, with support beam structures 1716 connecting to arms 1003A and 1003B via connectors 1718. In any of the Embodiments 1-10, the respective LED fireworks systems may include any combination of support rings 1610A-1610C, including any one or more of support rings 1610A-1610C alone or in any combination with one another.

All of the aforementioned exemplary embodiments make use of a support structure assembly 1200 (FIGS. 8 and 22) which provides (i) gripping surfaces for custom crane jib assembly 500 (see FIGS. 11A and B), (ii) means for mounting LED fireworks apparatus components (see FIGS. 9A-E), and (iii) means for resiliently restraining radially extending arms (and any part contained therein or affixed thereto) yet allowing for the more naturally looking arching/draping (see FIGS. 10A-D).

As can be seen from FIGS. 8, 22, and 9A-E, center support subassembly 1210 generally comprises an outer perimeter portion 1212 on the order of 8 feet in diameter—which correlates to parts 802, 902, 1002, and 1102 of Embodiments 2-5 and 7-10—and an inner perimeter portion 1218 on the order of 2 feet in diameter—which correlates to part 702 of Embodiments 1 and 6—with strengthening ribs 1217 therebetween; as envisioned, parts 1212, 1213, 1217, and 1218 are formed from 1×1×0.12 P&O ASTM A513 grade square tubing available from a number of commercially available sources, though this could differ. Center support subassembly 1210 further comprises a number of annular members 1214 on outer perimeter portion 1212 and annular members 1215 on inner perimeter portion 1218 each of which positionally affixes a radially extending arm when a threaded bolt is tightened against said arm (see FIG. 10D). Center support subassembly 1210 further comprises members 1213 each of which (i) interposes annular member pairs 1214/1215, (ii) is run in a perpendicular direction to pairs 1214/1215, and (iii) is adapted with double eyelets on both ends for said resilient restraining means (later discussed).

As can also be seen from FIGS. 8, 22, and 9A, center support subassembly 1210 further comprises some number of mounting interfaces 1219A-D any of which may be better suited than another for the various apparatuses and devices needed to produce the lighting and transient sensory-type effects previously described and later illustrated; note that for clarity only part 1219D is illustrated in FIGS. 9B-E. For example, mounting interface 1219D is a round aluminum plate-type interface—which is well suited for center LED fixtures (and would serve as an effective heat sink). Shelf-like mounting interface 1219A may be best suited for oddly shaped devices such as bubble machines, smoke/fog machines, cold spark machines, or air cannons (later discussed). Bracket-like mounting interfaces 1219B may be well suited for heavy parts—for example, enclosures which house controllers (e.g., any model of pixel controller available from HolidayCoro, Houston, Texas, USA), power supplies (e.g., 12V power supplies also available from HolidayCoro), fans (as are available from a number of commercial sources), and associated wiring and connectors for control and programming of any of the aforementioned (e.g., any model of XConnect connector from aforementioned Wired Watts and any model of DMX wiring, Ethernet wiring, or other wiring capable of carrying e.g., SPI data using WS2811 pixel protocol). Mounting interface type 1219C may be best suited for apparatuses that need to rotate freely or are mounted in a non-standard orientation (e.g., via clamps).

Lastly, center support subassembly 1210 further comprises a portion 1211 and a portion 1216 which are adapted for being gripped and pivoted by custom jib assembly 500, respectively. As can be seen from FIG. 11A, custom jib assembly 500 includes a hydraulically operated portion 502 which, in response to a control (e.g., at the bed of mobility means 200), pivots subassembly 1210 (e.g., on the order of 20 degrees upward or downward with respect to an axis extending along the length of part 1211) when part 502 is pivotably secured (e.g., via bolt and nut combination) to part 1216. A main jib body 501 includes hooks 504 at the distal end to grip and clamp down on part 1211 so to positionally affix and orient subassembly 1210 when lifted without pinching or interfering with what will be referred to as an umbilical cord 503. As alluded to earlier herein, a crane or jib including a hydraulically operating portion may not be needed or used, etc.

While the precise composition of umbilical cord 503 will differ depending on the needs of the application, devices mounted to support structure assembly 1200, need for electrical shielding to avoid impacting control signals, or anticipated wind loading, for example, umbilical cord 503 will generally comprise in one or more bundles (i) wiring for Ethernet, DMX, E1.31, or any combination thereof; (ii) power supply wiring for one or more strings of LEDs and/or LED lighting fixtures; and (iii) a lightweight support line or cable (e.g., 1/16 inch to 1/8 inch DYNEEMA® performance rope available from Koninklijke DSM N.V., Heerlen, Netherlands) to better ensure safe operation, correct orientation in situ, and prevent twisting of parts when elevated.

It is also of note that the presence of an umbilical cord 503 presents a unique opportunity for additional lighting effects; this is illustrated in FIG. 11B. Here, LEDs 505 (which may be the same or similar to integral driver LEDs 705 and 1105) together with their wiring 507 are spiral-wrapped and secured via cable tie 506 at predetermined increments across the total length of umbilical cord 503; here, approximately 160 feet, though this depends on both the total extended length capacity of crane assembly 100 and limitations on data communication using the aforementioned means and protocol. Having LEDs leading from the ground up to any of Embodiments 1-5 (and vice versa) allows for an enhanced theatrical experience that more closely emulates a traditional fireworks show insomuch that tail effects can be produced (later discussed).

The other important subassembly which forms a part of support structure assembly 1200 is a resilient member subassembly 1220; see FIGS. 8, 22, and 10A-D. Here, resilient member subassembly 1220 includes a plurality of cables 1221 (e.g., stainless steel, 1×7 strand, 1/16-inch aircraft cable available from Fortune Rope, Bristol, Rhode Island, USA) with associated fastening devices; FIGS. 10A-C shows cables 1221 as they exist in situ with parts 1212 and 1218 (not labeled) overlaid for context. Each cable is secured to center support subassembly 1210 at a proximate end 1225 via a removable fastening device 1226 (here, a threaded nut and bolt combination) inserted through an eyelet of part 1213. This type of connection is repeated for one or two locations at each radially extending arm, at an intermediate connection point 1223, at a distal connection point 1224, or at both an intermediate and distal connection points 1223/1224. In this sense, radial extending arms 703, 803A/B, 903A/B, 1003A/B, and 1103 may have one or two sets of double eyelets along their length to establish the connection illustrated at point 1225 in FIG. 10D, though it is of note that eyelets are not illustrated in FIGS. 3-7. Lastly, to achieve a desired level of tension, support, and/or natural drape, an adjustable device 1222 (e.g., any model of stainless steel jaw & jaw turnbuckle available from US Cargo Control, Urbana, Iowa, USA) is included at least at proximate connection point 1225.

Figure 22:
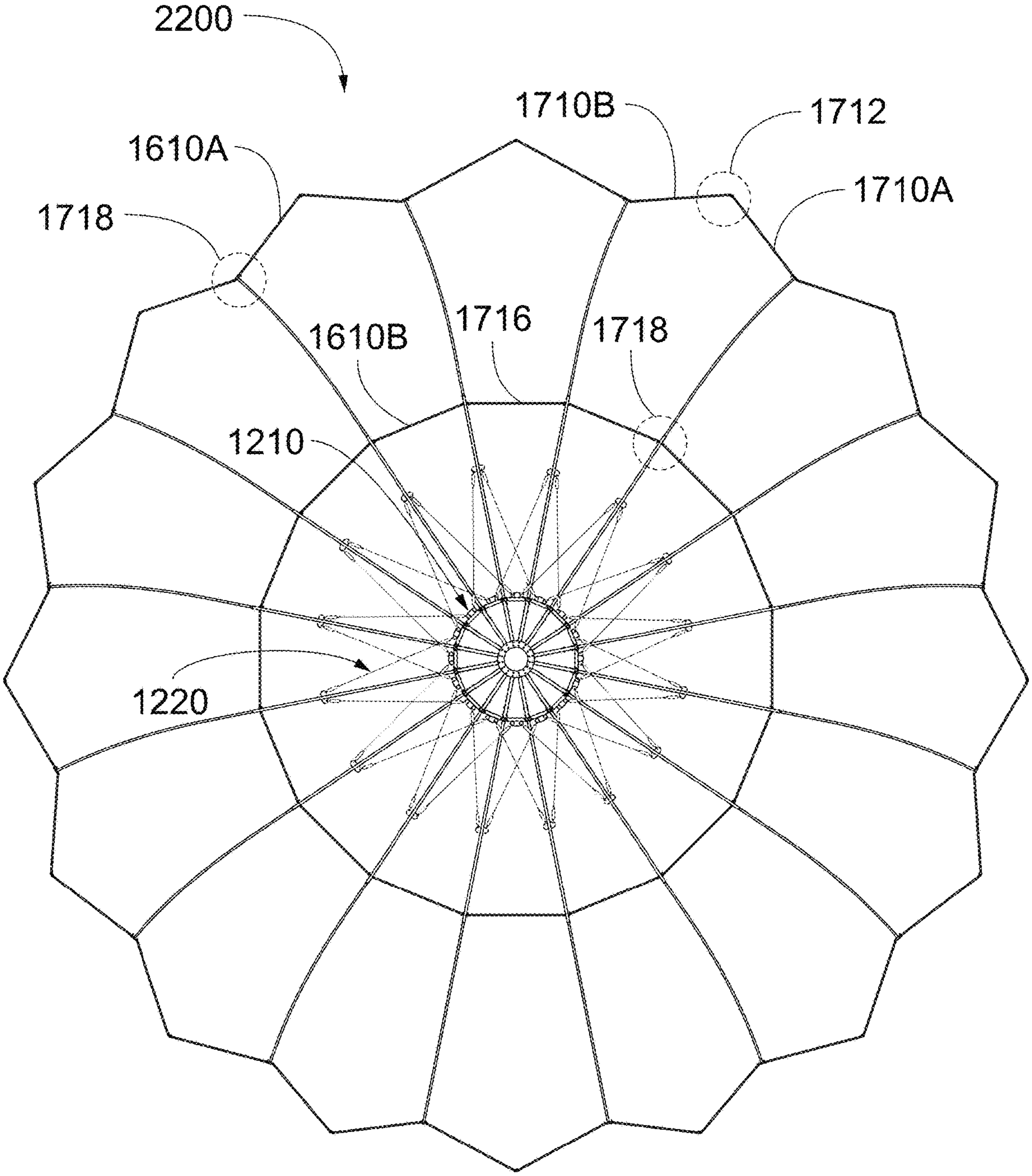
FIG. 22 illustrates an eleventh embodiment according to aspects of the present disclosure that is similarly or identically configured as that of FIG. 8 except that the eleventh embodiment includes a radially intermediate ring of stabilizers, and a radially outermost ring of stabilizers.

Additionally, as shown in FIG. 22, the overall support structure 2200 can include any number of support rings 1610, such as support rings 1610A and 1610B. Outer support ring 1610A includes a number of support beam portions, including support beam portion 1710A and 1710B (collectively, support beam portions 1710). Support beam structures 1710 may be connected to one another via one or more hinges, such as hinge 1712. This may enable outer support ring 1610A to have more rigid support structures for the relatively unstable arms, while still allowing the system to collapse for transportation. The long, light nature of the arms, along with their placement high in the air, may lead to swaying or general instability of structure 1700. Additionally, the further away from the center of the structure the arms are, the more susceptible that portion of the arms are for swaying and instability. Placing outer support ring 1610A and support beam structures 1710, which may be made of steel, plastic, aluminum, fiberglass, or any other rigid and lightweight material that effectively provides support to the arms, with support beam structures 1710 being either solid or hollow beams.

In some instances, in addition to being connected by hinge 1712, one of support beam structure 1710A or 1710B may disconnect from the one or of the arms that the respective support beam structure 1710 is connected to in order to further provide ease of storage. For instance, connector 1718 may be a releasable connection structure attaching one of support beam structures 1710 to one of the arms. While connected, support beam structure 1710 may hinge around connector 1718 and hinge 1712 to allow for rotational movement of the support beam structure around connector 1718 and hinge 1712. When being deconstructed, connector 1718 may release, such as by removing a pin or unscrewing a nut-and-bolt connector, allowing support beams structures 1710 to either be completely removed or to fold down by the arms for easier storage.

In some instances, it may further be beneficial to include a second support ring structure to provide further stability to the arms. In such instances, structure 1700 may additionally include inner support ring 1610B. Inner support ring 1610B may be made of a number of support beam structures 1716, which may be constructed in a similar manner and composition as support beam structures 1710 of outer support ring 1610A. Given the shorter length of the space between the arms closer to the center, support beam structures 1716 may attach directly to multiple of the arms via connectors 1718, which may be structurally and functionally similar to connectors 1718 for support beam structures 1710 but located closer to the middle of the arms. When being deconstructed, connector 1718 may release, such as by removing a pin or unscrewing a nut-and-bolt connector, allowing support beams structures 1716 to either be completely removed or to fold down by the arms for easier storage. Given the direct connection to multiple arms, inner support ring 1610B may provide a more rigid system of support to structure 1700 as opposed to outer support ring 1610A.

Looking at FIG. 23, the connector 1718 provides for movement between an arm (e.g., 1003B) and the stabilizers (referred to earlier herein as support beams 1710A and 1710B). As a result, in windy conditions some flexing of the apparatus is allowed but dampened to reduce the likelihood of the arms fatiguing, etc.

In some instances, support rings 1610, including support rings 1610A, 1610B, 1610C (e.g., of FIG. 20), and 1610D (e.g., of FIG. 21) may also contribute to the various lighting effects provided by the fireworks systems. For instance, the various support beam structures may additionally include LED lights along the body to provide additional lighting effects as described elsewhere throughout this disclosure.

FIG. 23 illustrates a connector assembly 1718 and a ring support structure, which could be used with any of the aforementioned embodiments according to aspects of the present disclosure. Connector 1718 may be the overall structure that enables any of the support beam structures 1710 or 1716 to connect to arms of the LED fireworks system, such as arm 1003B.

Connector 1718 may include fasteners 1720A and 1720B (collectively, fasteners 1720). Fastener 1720A may be a nut-and-bolt fastener, may be used in more permanent structures that are not taken down routinely, or may be used to connect support beam structures that are left attached for storage (e.g., support beam structure 1710B, when deconstructed, may simply fold down alongside arm 1003B for storage). Fastener 1720B may be a pin fastener, and may be used in more temporary structures, or may be used to connect support beam structures that are not left attached for storage (e.g., support beam structure 1710A, when deconstructed, may fold down alongside an arm other than arm 1003B for storage). However, in other systems, fastener 1720B may be used in more permanent structures or left attached for storage, or fastener 1720A may be used in more temporary structures or removed for storage. Any combination of fasteners 1720A and 1720B may be used in any of the embodiments presented herein.

Fasteners 1720A and 1720B may protrude through arm extension 1722 and support beam structures 1710, locking in place on an opposite side of arm extension 1722. Arm extension 1722 may be permanently or temporarily affixed to arm 1003B, such as by being welded, clipped, or otherwise attached to arm 1003B.

FIG. 24 illustrates an arm portion with an attached support structure in a folded position which could be used with any of the aforementioned embodiments according to aspects of the present disclosure. When deconstructed for storage, as shown in FIG. 24, support beam structures 1710A and 1716 may disconnect from a second one of arms 1003 and fold down alongside arm 1003B.

Figure 25:
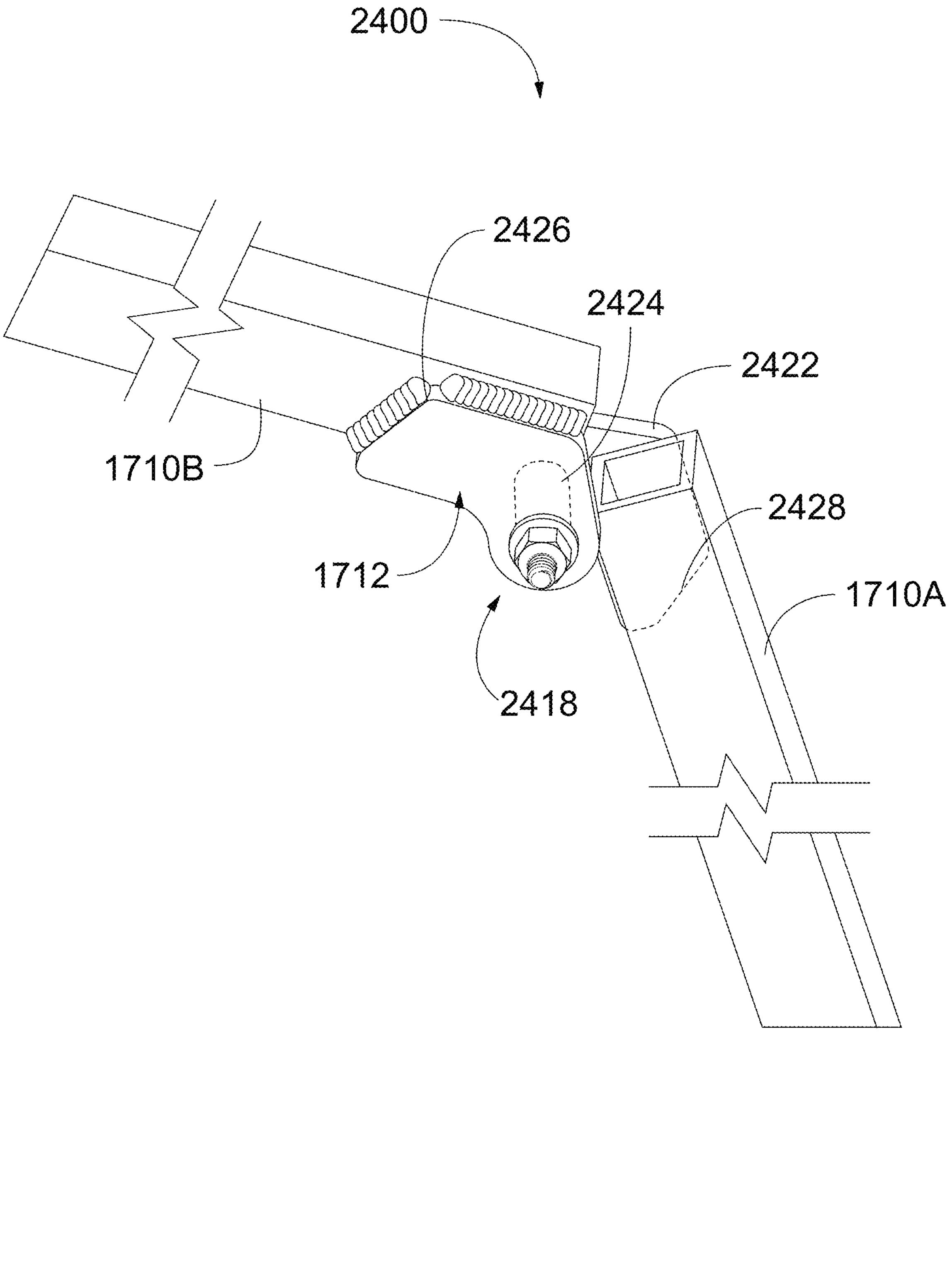
FIG. 25 illustrates a hinge structure assembly as part of a ring support structure, which could be used with any of the aforementioned embodiments according to aspects of the present disclosure. More specifically, an adjustable joint is shown for adjusting the effective length of the stabilizer ring.

FIG. 25 illustrates a hinge structure assembly as part of a ring support structure, which could be used with any of the aforementioned embodiments according to aspects of the present disclosure. Hinge 1712 may be any hinge structure that enables support beam structures 1710A and 1710B to rotate relative to one another.

Figure 12:
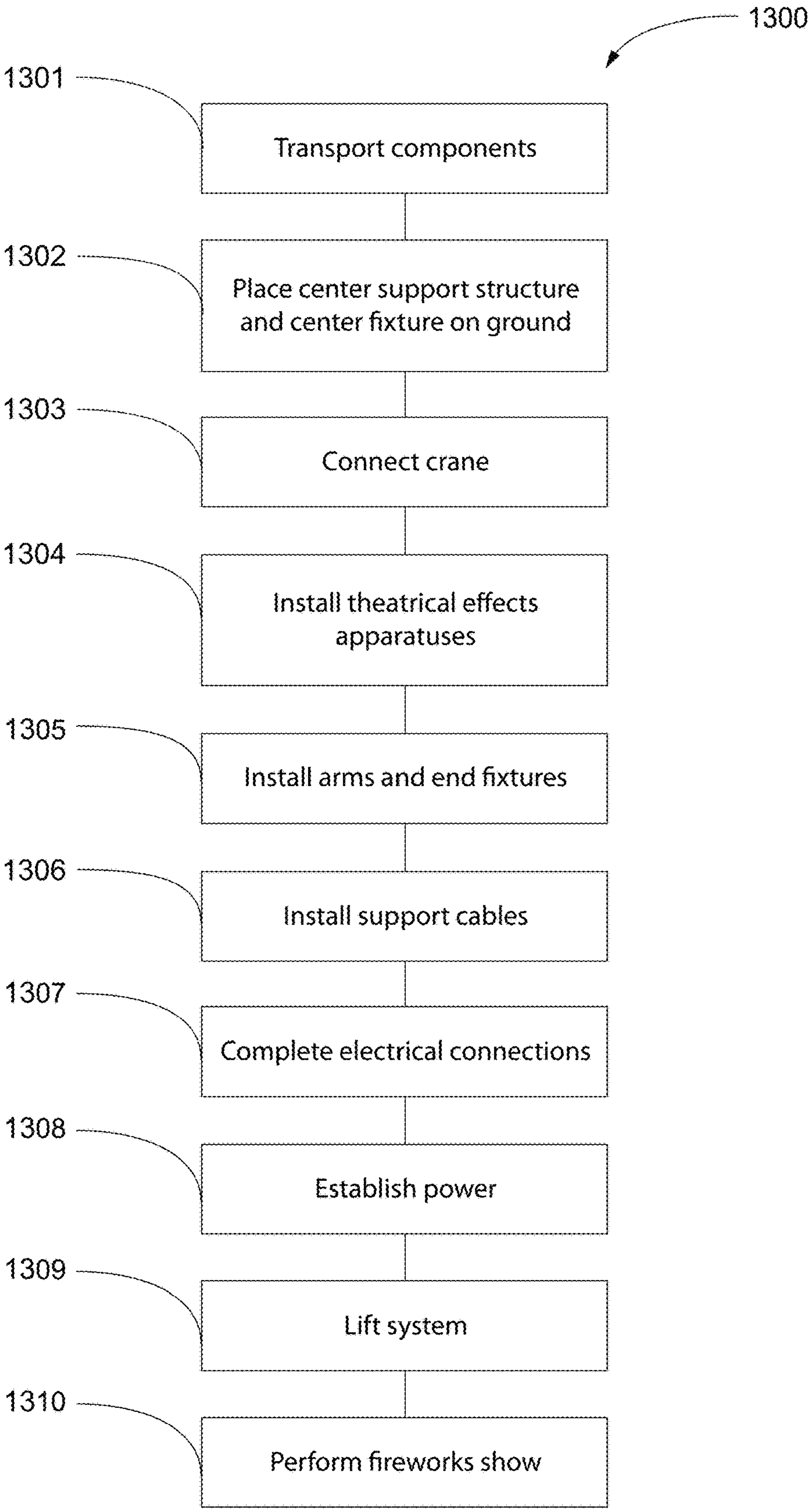
FIG. 12 illustrates one possible method of assembling the mobile lighting system of FIGS. 2-11B and preparing such for performing a fireworks show according to aspects of the present disclosure.

Support structure assembly 1200 and/or 2200, as envisioned, forms the backbone and common infrastructure for mobile lighting system 11 irrespective of the particular apparatuses, features, or effects. While some specific embodiments of such have been discussed, there are a large number of options and alternatives—some of which are later discussed. That being said, in each instance where mobile lighting system 11 could be temporarily (or permanently) installed so to provide a theatrical experience that (i) does not pose a burning hazard, (ii) can be used in a wide variety of settings and areas (including residential areas), (iii) can not only emulate the look and feel of traditional fireworks but add additional theatrical effects, and (iv) is multi-use, a common approach to installation can be followed; this is illustrated in FIG. 12.

According to a first step 1301 of method 1300, all components of mobile lighting system 11 are transported to a site by mobility means 200. An over-the-road vehicle can be enabled with a crane (e.g., model National Crane 800D available from The Manitowoc Company, Inc., Milwaukee, Wisconsin, USA) and as along as outer perimeter portion 1212 does not exceed the width of the bed (or height above the bed as allowed in transit), and as long as the length of arms 703, 803A/B, 903A/B, 1003A/B, and 1103 do not exceed the length of the bed, it is anticipated mobility means 200 can navigate nearly any setting (including residential areas). Of course, in practice, arms 703, 803A/B, 903A/B, 1003A/B, and 1103 may have to be produced in portions which slip fit or are otherwise operably connected once on site (see step 1305). It is further contemplated that there could be a trailer mounted crane embodiment that is pulled by a truck cab or the like, etc.

Once on site, components are unloaded and assembled according to steps 1302-1305. First, center support subassembly 1210 is unloaded and placed on the ground with center fixture 701, 801, 901, or 1001 facing downward towards the ground such that parts 1211 and 1216 are facing upward for attachment to customized jib assembly 500. In practice, it is likely that any center fixture will be preinstalled at mounting interface 1219D prior to shipping so to (i) reduce onsite setup time, (ii) reliably establish a heat transfer path, and (iii) reduce onsite connection and routing of wiring—though this is by way of example and not by way of limitation.

According to step 1303 crane assembly 100 is lowered so that customized jib assembly 500—which is positionally affixed to crane assembly 100 and operated by control means at mobility means 200—can be attached to center support subassembly 1210 (see again FIG. 11A and related discussion). At this point, center support subassembly 1210 with mounted center LED fixture can be lifted off the ground some nominal amount so other apparatuses can be mounted (see again FIG. 9A and related discussion) according to step 1304, including any mounted enclosures with power providing/regulating devices.

Of course, not all devices are installed at or near the center of center support subassembly 1210; as is discussed in the embodiments, a number of theatrical effects (lighting and/or transient sensory type) are produced from devices along the length, at an intermediate point, and/or at a distal end of one or more radially extending arms. Again, in practice it is likely LEDs 705 or 1105, LED fixtures 805A-D, laser devices, and UV or phosphorescent paint or texture or objects 1005 are all installed on arms or arm portions prior to shipping such that step 1305 only requires (if needed) (i) slip-fitting arm portions, (ii) connecting wiring portions (see reference no. 706), and (iii) securing arms at paired annular members 1214/1215 (see again FIG. 10D and related discussion).

Once apparatuses are installed, resilient member subassembly 1220 is installed and tightened as needed to produce a desired level of support, strain relief or arching of arms (step 1306). Following this, all remaining electrical connections are completed according to step 1307, including unloading, laying out, and connecting umbilical cord 503; again, the number of wires in the bundle, number of bundles, and overall length will depend on such things as needs of the application, devices mounted to support structure assembly 1200, need for electrical shielding to avoid impacting control signals, or anticipated wind loading. Of course, it is wise to establish and verify power (step 1308) before fully lifting, positionally affixing, and directionally orienting LED fireworks apparatus 600 (see again FIG. 2), step 1309—though this could differ. The last step in method 1300 comprises performing a fireworks show (1310); this of course will vary in time, complexity, programming, and the like from application to application. However, in an attempt to illustrate what is possible according to aspects of the present disclosure, a few non-limiting theatrical effects are illustrated in FIGS. 13A-J and are presently discussed.

Figure 13A:
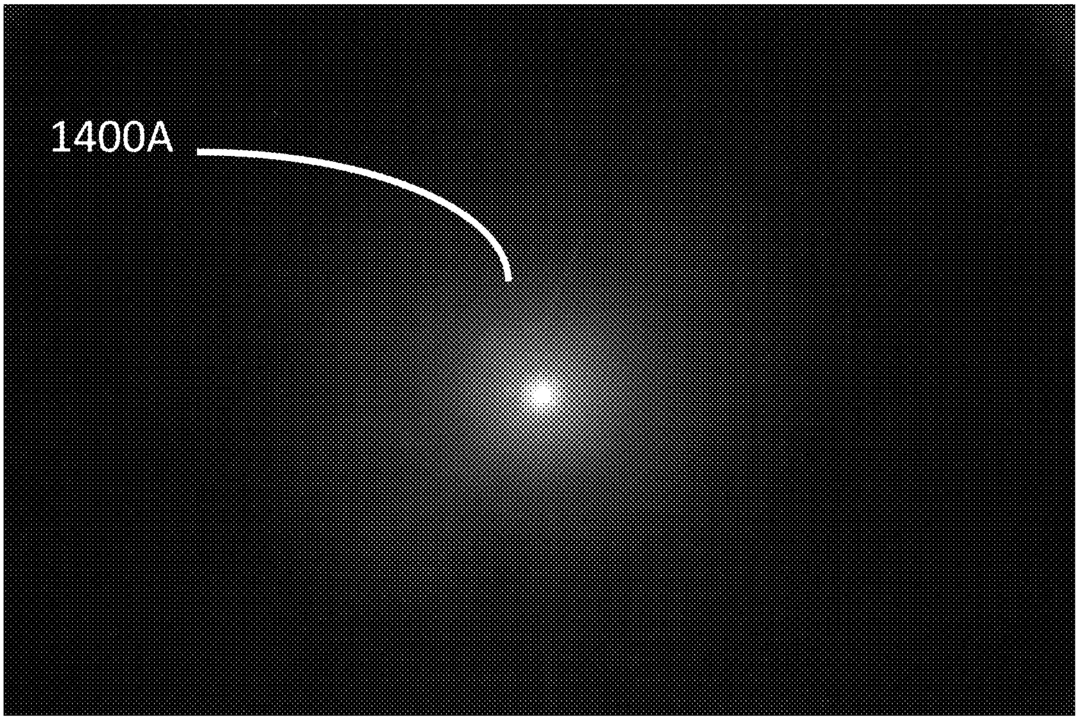
FIGS. 13A-J illustrate images of various, non-limiting lighting effects which may be produced at a fireworks show in accordance with the method of FIG. 12.
Figure 13B:
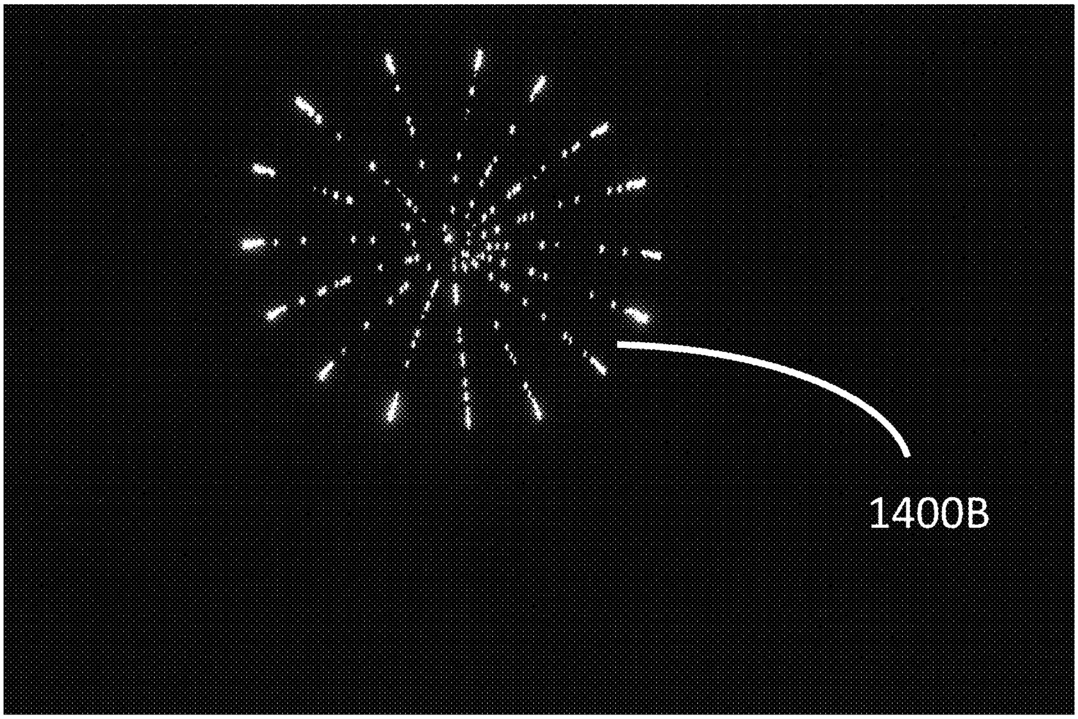
Figure 13C:
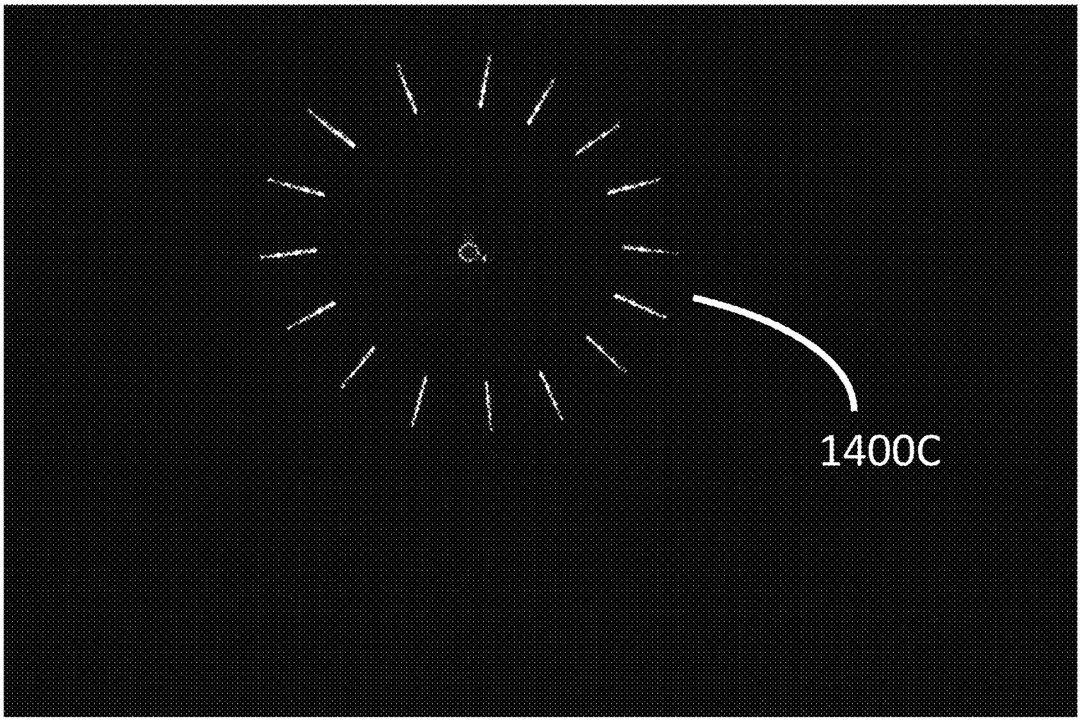
Figure 13D:
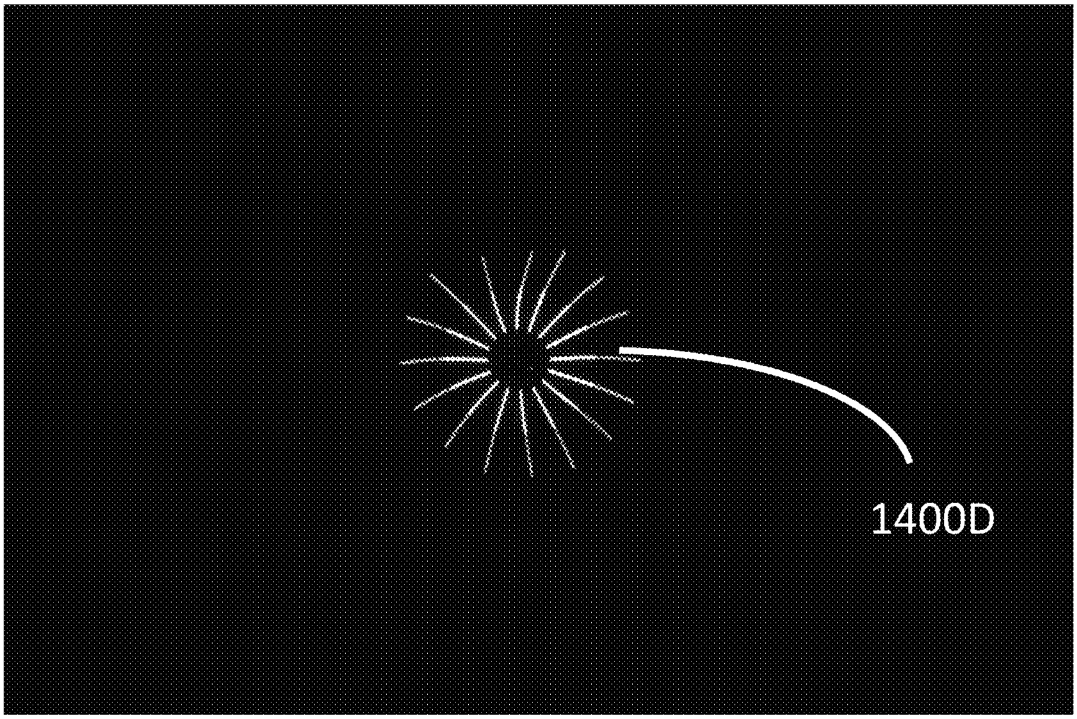
Figure 13E:
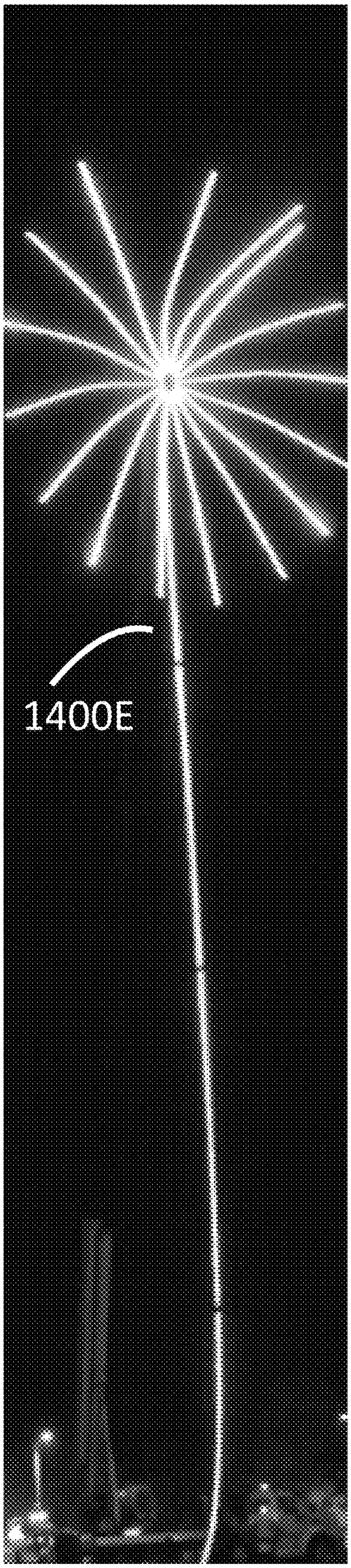
Figure 13F:
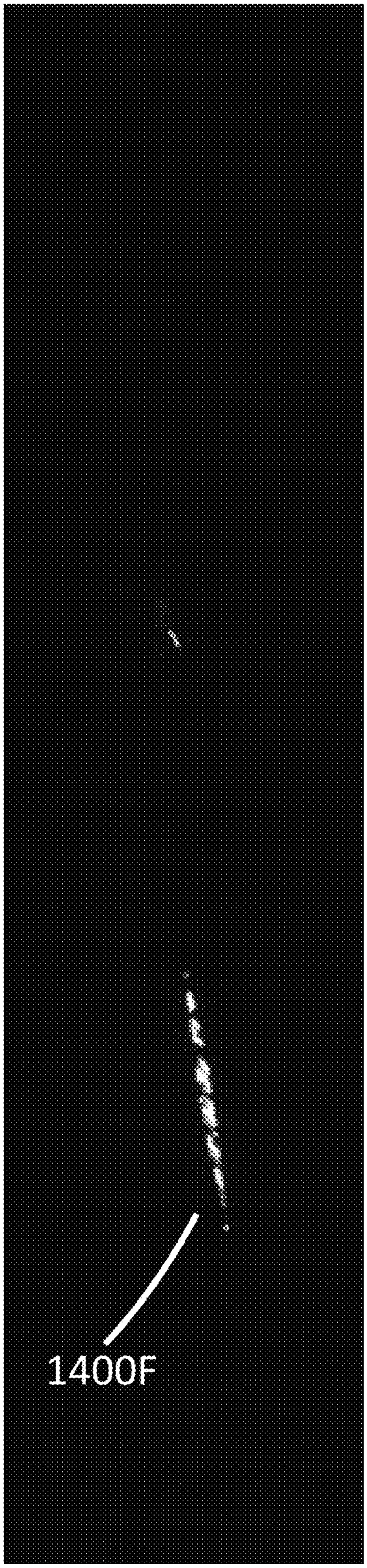
Figure 13G:
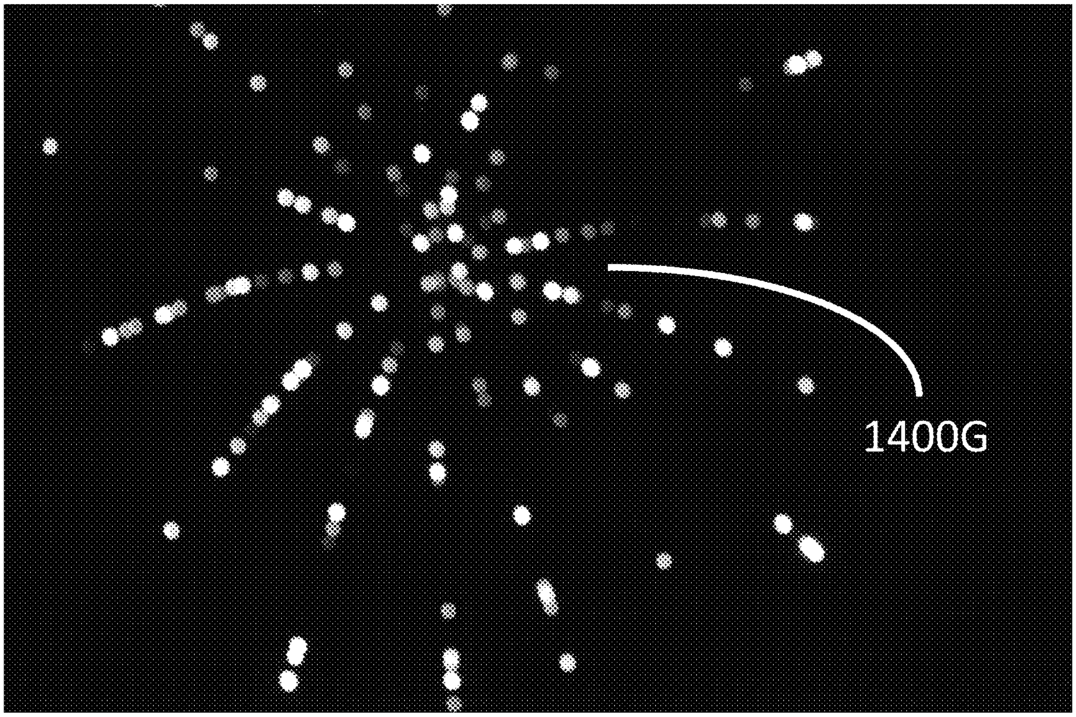
Figure 13H:
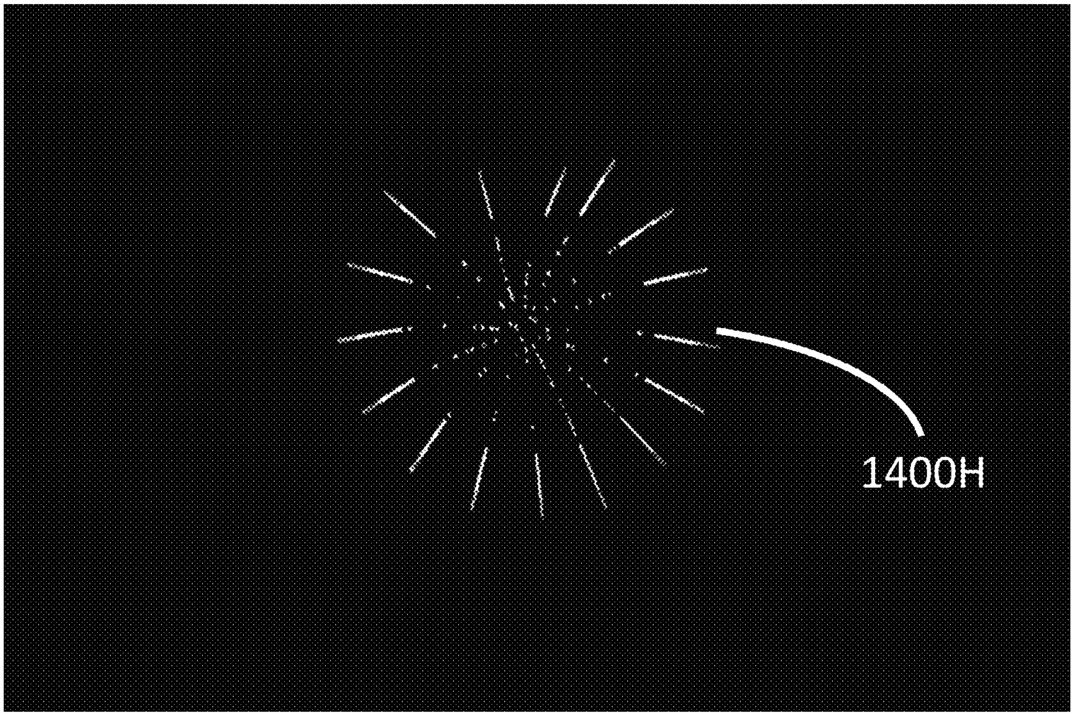
Figure 13I:
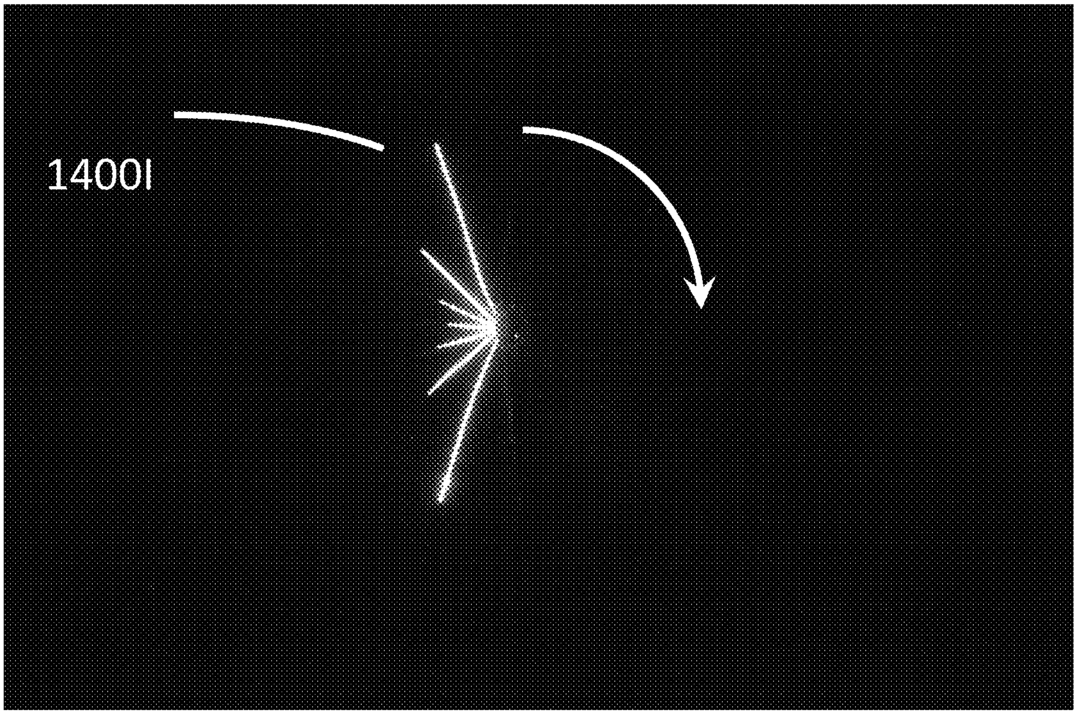
Figure 13J:
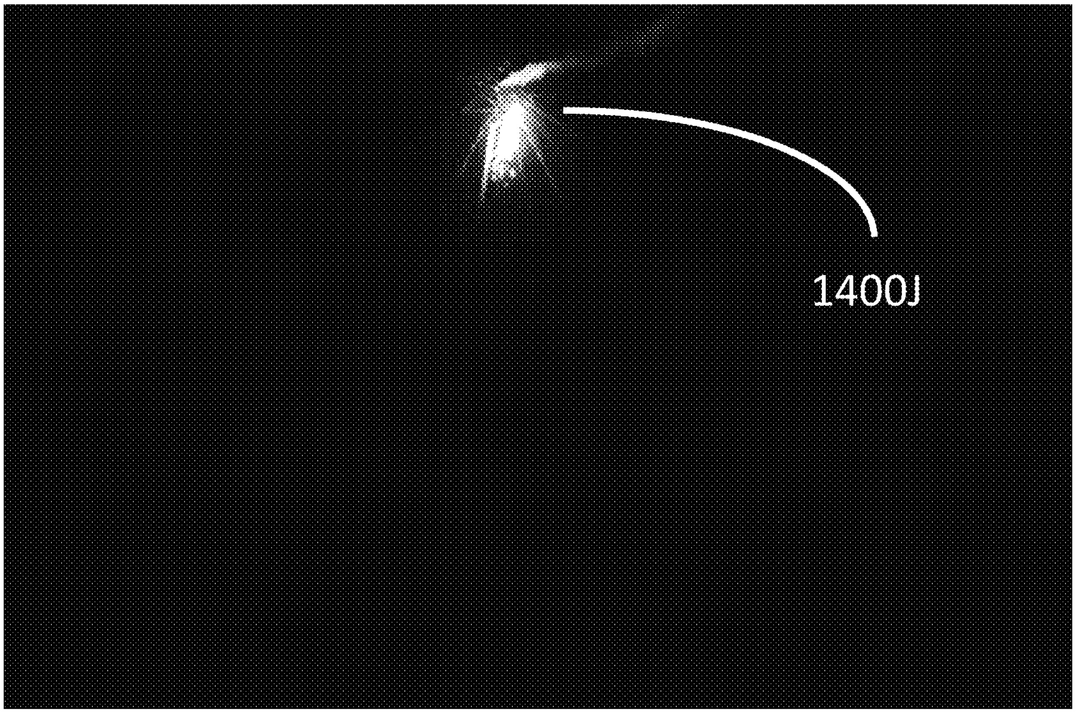

As can be seen, FIG. 13A illustrates a center burst lighting effect 1400A in a red color. FIG. 13B illustrates an end burst lighting effect coupled with a sparkle effect 1400B in an array of blue, yellow, and white. FIG. 13C illustrates a center burst effect coupled with a starburst effect 1400C whereas FIG. 13D illustrates a starburst effect with no center burst 1400D; note that (i) the center burst of FIG. 13C is not as intense as that in FIG. 13A, and (ii) the starburst effect of FIG. 13D is a solid two-color (orange and white) which extends the full length of radially extending arms (unlike in FIG. 13C in which the starburst effect is multi-colored and extends over only a portion of radially extending arms). FIG. 13E illustrates a solid color starburst effect (in green) with a solid two-color tail effect 1400E (in green and blue). FIG. 13F illustrates the same umbilical cord as 13E but having a timed (i.e., programmed), multi-color, traveling tail effect 1400F. FIG. 13G illustrates a sparkle effect 1400G in an array of whites, yellows, and blues, and FIG. 13H illustrates this same sparkle effect when coupled with a solid two-color starburst effect 1400H (here, in yellow and orange). FIG. 13I captures a single moment in a timed (i.e., programmed), traveling pinwheel effect 1400I; here the arrow indicates the rotation of the pinwheel. In practice, some subset of radially extending arms illuminate, then another arm following the direction of the arrow illuminates and an arm that was previously illuminated dims or power is removed to create a sense of motion—much like an actual pinwheel turning. FIG. 13J illustrates a waterfall effect 1400J which is achieved via a programmable, reusable cold spark machine (e.g., model Sparkular available from Eventtec Veranstaltungstechnik e.U., Rankweil, Austria) mounted at support structure assembly 1200 in a downward (relative to the site) orientation; a fountain effect could be likewise achieved by mounting in a generally opposite direction. It is important to note that currently cold spark machines may be considered pyrotechnic devices, but experimentation has found them to not be akin to traditional pyrotechnic materials (i.e., they do not pose a burning hazard and are multi-use).

The disclosure may take many forms and embodiments. The foregoing examples are but a few of those. To give some sense of some additional options and alternatives, a few examples are given below.

At a high level, it can be appreciated that mobile lighting system 11 can be used in a wide variety of settings without posing a burning hazard while still emulating the look and feel of a traditional fireworks show, and while many non-limiting examples of apparatus, method, and effects have been described and illustrated, more could be done (additionally or in lieu of) to provide an enhanced theatrical experience. For example, persons viewing traditional fireworks shows expect to hear a squeal as fireworks launch and a loud booming just before seeing the fireworks—as such, a sound machine (a variety of which are available from commercial vendors) or a laptop device with external speakers could be installed on the bed of mobility means 200 and synched with the LED fireworks show using traditional fireworks sounds (e.g., any fireworks sound effect available from Fesliyan Studios Inc., Rancho Cordova, California, USA) so to provide such a transient sensory-type experience. As another example, persons viewing fireworks at large venues (e.g., stadium 400, FIGS. 1 and 2) sometimes have an expectation of additional theatrics; as such, so-called LED flames (e.g., model VFE-L together with model VF8c available from Vapor Flame, San Diego, California, USA), commercially available pitching machines with objects (e.g., keepsake, promotional, or designed for theatrical effect), or devices to produce music (e.g., using the aforementioned sound machine or laptop with music from Fesliyan Studios, Inc.) could be installed on the bed of mobility means 200, or on the ground. As yet another general example, perforations in arms 903B could be designed such that laser light 905 projects a particular image against a surface at the venue (e.g., to simulate an animation), colors could be coordinated with seasons or teams or events, or the LEDs themselves could serve additional purposes (e.g., after the LED fireworks show, LEDs could be programmed to show a thank you message, or exits, or how traffic should flow). All of the aforementioned are possible, and envisioned.

Figure 14:
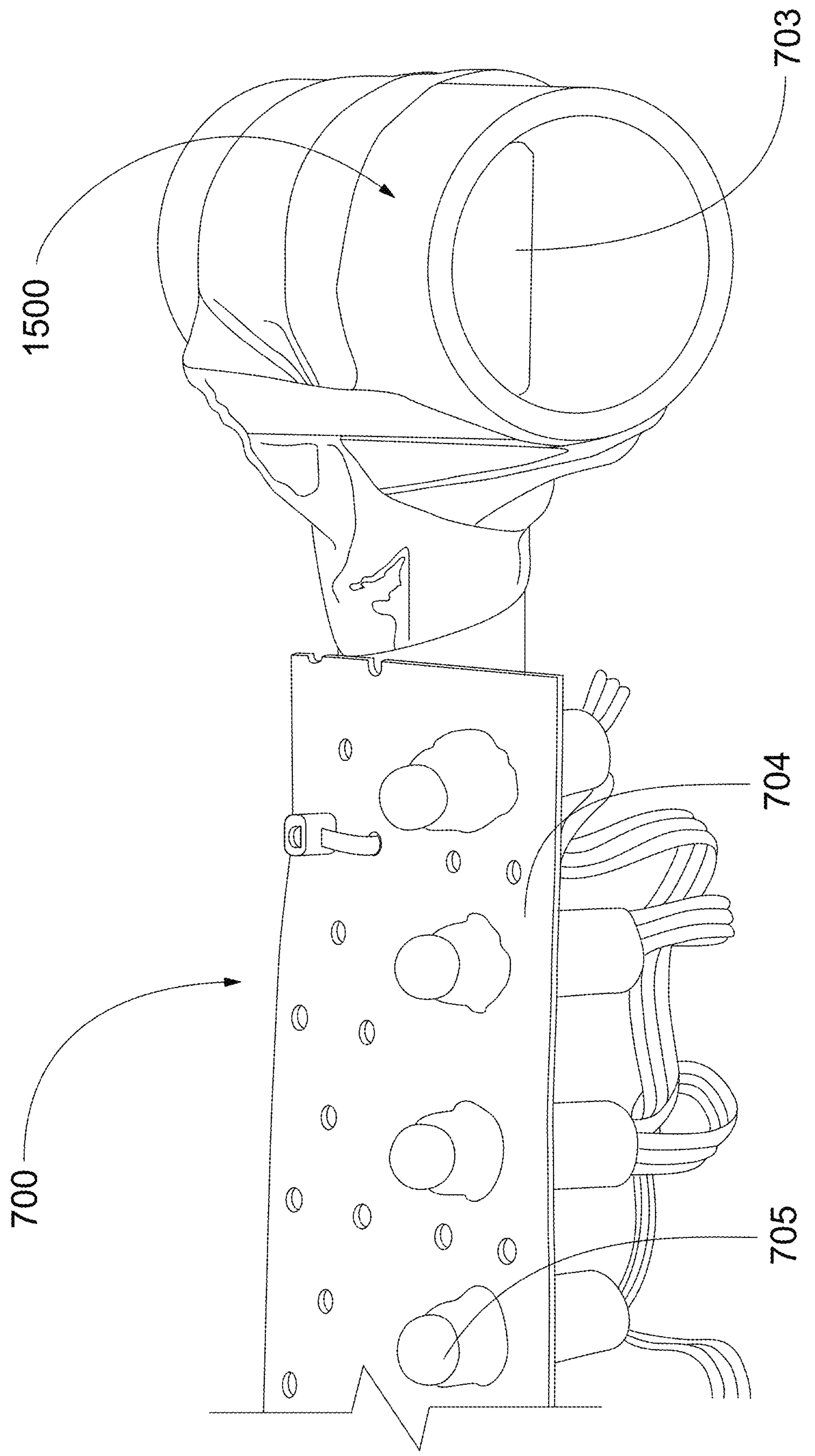
FIG. 14 illustrates Detail A of FIG. 3 and including optional roller assembly 1500.
Figure 15A:
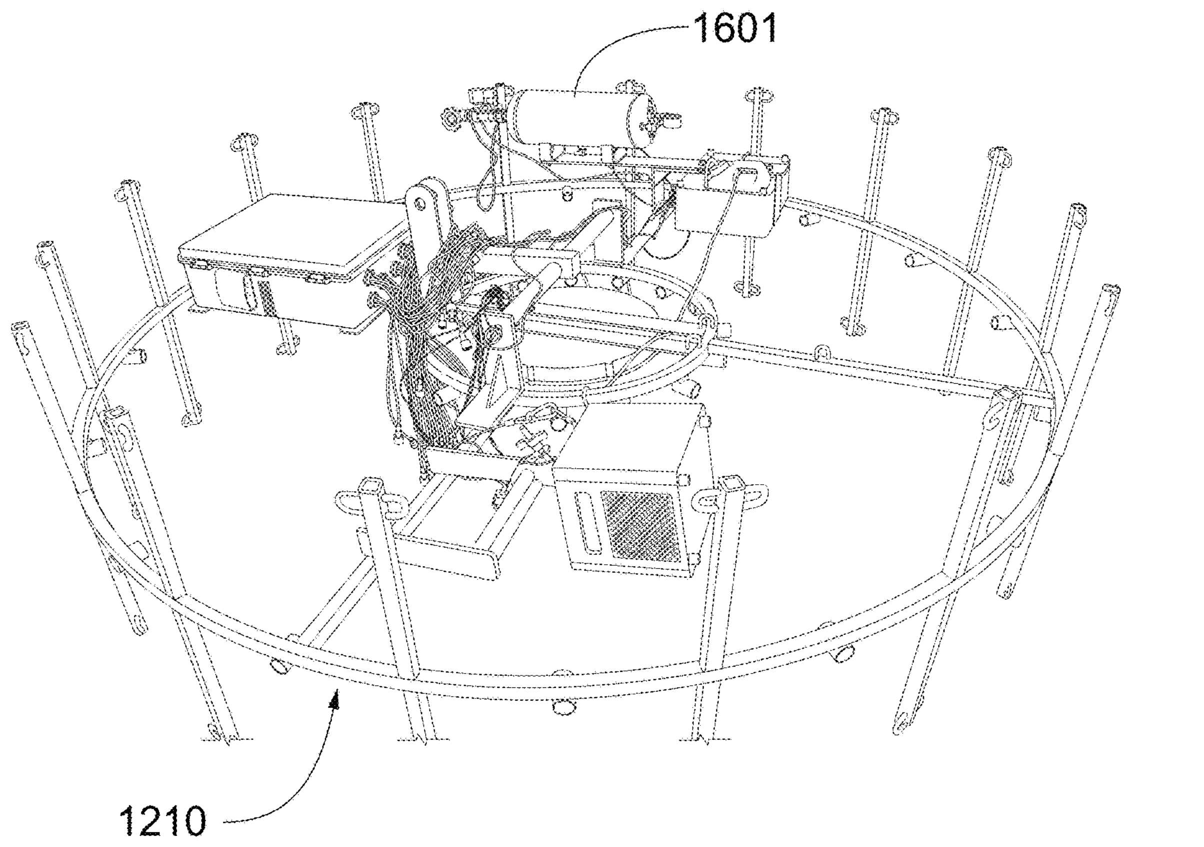
FIGS. 15A and B illustrate installation of an optional air cannon with objects adapted to provide a transient sensory-type effect as can be seen in FIG. 15C.
Figure 15B:
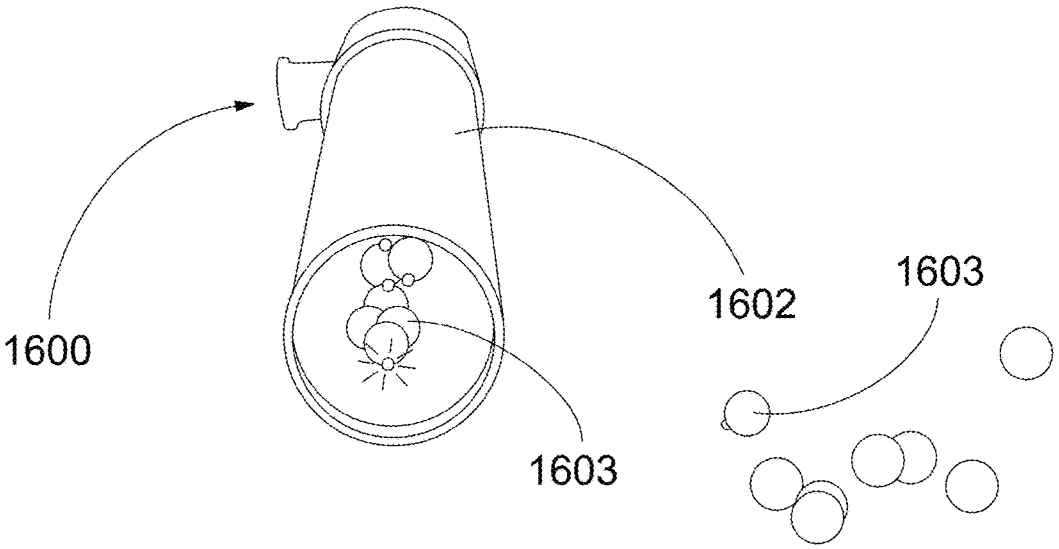
Figure 15C:
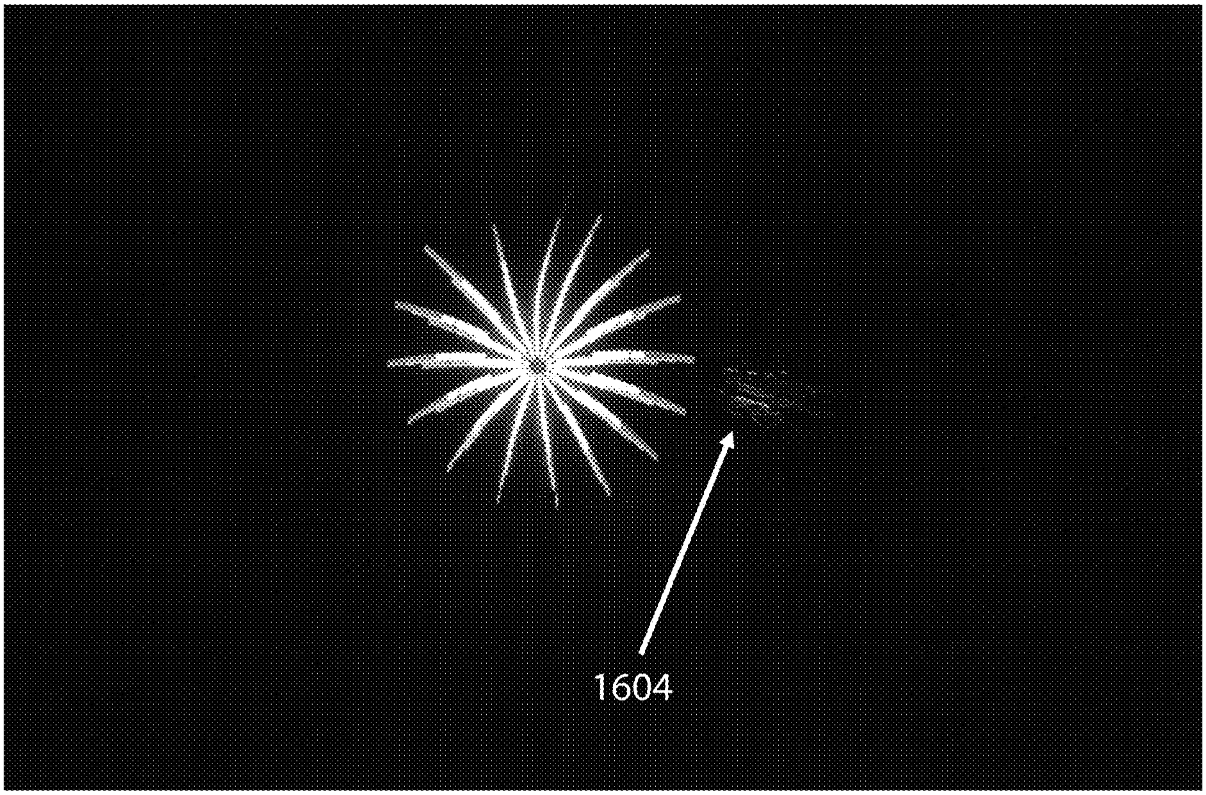

With more specific reference to the apparatuses described and illustrated herein, a number of options and alternatives are possible. For example, if mobile LED lighting system 11 is being raised and lowered in a grassy, wet, or soft environment, it may be desirable to include some manner of roller assembly 1500 to prevent damage to the ground; see FIG. 14. As another example, while not illustrated as such, umbilical cord 503 might include multiple bundles either bound or wound together; umbilical cord 503 might also include flexible conduit or shielding means, or even strain relief means such as is described in U.S. patent application Ser. No. 17/303,243 incorporated by reference herein. As yet another example, additional apparatuses could be installed on or at support structure assembly 1200 to provide additional theatrical effects—and in some instances, LEDs could be omitted altogether (to create a unique theatrical performance). FIGS. 15A and B illustrate an air cannon assembly 1600 (e.g., Tour Boss professional air cannon as available from Theatre Effects, Erlanger, Kentucky, USA) which generally includes an air tank portion 1601 mounted to one of mounting interfaces 1219A-D, aimable cannon 1602, and any number of objects 1603 which can be shot (e.g., via controls on the bed of mobility means 200, or even programmed via DMX if additional structure is added) to produce a transient sensory-type effect 1604 (see FIG. 15C). In practice, objects 1603 can be glowing golf balls (e.g., any model available from Night Flyer Golf, Vernon Hills, Illinois, USA), light activated balls or objects (e.g., model Night Eagle golf ball available from The Glow Store, Inc., Victoria, British Columbia, Canada), or even more traditional materials such as ping pong balls with attached parachutes that have a fluorescent coating. All of the aforementioned are possible, and envisioned—whether as a supplement to, or a replacement for, LED lighting effects.

Lastly, there are a number of options and alternatives which are envisioned to lend maximum flexibility to the disclosure as described and illustrated herein. For example, any means of fastening devices (e.g., slip fitting, threading) could differ (e.g., instead be glued or welded). Parts can be shaped of sized differently; for example, radial extending arms 703, 803A/B, 903A/B, 1003A/B, and 1103 may be square instead of round, and pre-bent to achieve the desired arching/draping instead of making use of resilient member subassembly 1220. In that same vein, parts making up any assembly or subassembly could be more, fewer, or different; for example, resilient member subassembly 1220 could actually include more cables 1221 and additional connection points for high wind applications, or resilient member subassembly 1220 could include an anchoring system for anchoring to the ground for a permanent installation of LED mobile lighting system 11. This is likewise true for methods of programming and operation; for example, controls in general could be hard wired, wireless, optical, infrared, deliver control commands or receive data packets in a different manner, or use a different protocol, for example. As another example, batteries (e.g., mounted at interfaces 1219A-D) might be used to power devices instead of power lines running down to a generator on the bed of mobility means 200. Also, different materials could be used; for example, phosphorescent materials could be used instead of UV activated or other fluorescent materials, UV lights that emit in the 365 nm range or a range more typical of true UV lights might be used instead of 400 nm range UV lights (as used herein), OLEDs might be used instead of more traditional LEDs, any number of parts could be painted black (if desired) rather than be produced as black (as in parts 704 and 1104), and radial extending arms 703, 803A/B, 903A/B, 1003A/B, and 1103 might be formed from stainless steel instead of 1026 carbon steel. Lastly, while the aforementioned has been described as a mobile lighting system, it is important to note that the system may not be mobile (i.e., a permanent installation) or may be designed as a plurality of kits which are stored in one or more locations and are only mobile in the sense that a crane is rented for use with said kit. Again, all of the aforementioned are possible, and envisioned.

Any of the fireworks or theatrical apparatuses disclosed herein may be provided as a substitutable or retrofittable assembly for existing lighting assemblies already in the field. That is to say, they may be attached to a portable apparatus or a permanent structure and then swapped out for another style or as a replacement, etc. Moreover, these apparatuses may be configured in a manner to limit their projected area so as to limit aerodynamic forces exerted on the apparatus.

Looking at FIGS. 17 thru 22, various embodiments of a substitutable fireworks or theatrical apparatus may comprise a central hub (e.g., see 702 in FIG. 17, 802 in FIG. 18, etc.), a plurality of arms (e.g., see 703 in FIG. 17, 803 in FIG. 18, etc.) extending away from the central hub, and a plurality of light sources (e.g., see 705 in FIG. 17, 805 in FIG. 18) attached to the plurality of arms.

Turning to FIG. 24, at least one of the plurality of arms 1003B extends along an at least partially arcuate sweep path 2300. This arcuate shape may be caused by the weight of the arm, and/or the physical construction of the arm. For example, at least one of the plurality of arms includes a bent portion 2302 such as when aluminum tubing or the like is bent into a desired shape to mimic the path of a falling firework. This arcuate shape may not be present if the arm extends purely downwardly or if otherwise is undesired. Also, at least one of the plurality of arms may comprise tube members (e.g., outer tube member 2304, inner tube member 2306) that are telescopically connected to each other.

As seen in FIG. 23 and alluded to earlier herein, the substitutable apparatus may further comprise a stabilizer assembly 2400 that includes a first stabilizer member (e.g., see 1710A) disposed proximate a first arm 1003B of the plurality of arms on a first side 2402 of the first arm, a second stabilizer member (e.g., see 1710B) disposed proximate a second side 2404 of the first arm, and a slop joint connector 2406 that surrounds the first arm 1003B, joining the first stabilizer member (e.g., see 1710A) to the second stabilizer member (e.g., see 1710B).

More specifically, the slop joint connector 2406 may include a first plate 2408 extending from the first stabilizer member (e.g., see 1710A) to the second stabilizer member (e.g., see 1710B), and a second plate 2410 extending from the extending from the first stabilizer member to the second stabilizer member, forming a slot 2412. The first arm 1003B extends into the slot 2412 and is free to sway therein at least initially during assembly. As shown in FIG. 23, the slot 2412 defines a clearance 2414 between the first stabilizer member (e.g., see 1710A), and the first arm 1003B. A similar clearance may be provided between the second stabilizer member, and the first arm.

In addition, the slop joint connector 2406 may include a nut and bolt fastener combination (e.g., see 1720A) connecting the first plate, the second plate, and the first stabilizer member (e.g., see 1710A) together. This may provide a pivot point during assembly and disassembly. Also, the slop joint connector 2406 may include a pull pin 2416 connecting the first plate 2408, the second plate 2410, and the second stabilizer member (e.g., see 1710B) together. This may allow quick disassembly and assembly since the user can quickly insert or retract the pin. If desired to provide some rigidity and support, the first plate 2408, and the second plate 2410 may be attached to the first arm 1003B via a fastener, a weld, etc.

As seen in FIG. 25, the stabilizer assembly 2400 may also include an adjustable joint 2418 having a first bracket 2420, and a second bracket 2422 rotatably connected to the first bracket 2420 via a bushing 2424. The first bracket 2420 defines a first free end 2426 that is configured to rotate until the first free end 2426 is adjacent the second stabilizer member (e.g., see 1710B), and the second bracket 2422 includes a second free end 2428 that is configured to rotate until the second free end 2428 is adjacent the first stabilizer member (e.g., see 1710A). The first free end 2426 may be attached to the second stabilizer member (e.g., see 1710B), and the second free end 2428 is attached to the first stabilizer member (e.g., see 1710A). These attachments may include fasteners, welds, etc. The radially outermost stabilizer ring or assembly may employ such joints so that this ring or assembly has the appropriate circumferential or perimeter length.

The number and placement of these flexible, adjustable, or slop joints may be varied depending on the application. The number and placement of such joints that are fastened, welded, etc. may also be varied. For example, one slop joint may be welded or fastened while another slop joint that is in close proximity either radially along the arm or circumferentially proximate another arm may not be welded or fastened, etc. Similarly, one adjustable joint that is welded or fastened to an arm may be in close proximity to another adjustable joint either radially along the arm or circumferentially proximate another arm that is not welded or fastened.

The fireworks or the apparatus may be large having an outer diameter of about 60 feet and an inner diameter of the inner hub of about 10 feet. The stabilizer assembly may help reduce the risk of fatigue due to weight and wind induced vibration. Due to the large size, the length of the stabilizer rings or assemblies may need to be adjusted. So, the slop joints and the adjustable joints just described may be used adjust the length of these rings or assemblies, accommodating manufacturing tolerances. Also, the stabilizer rings or assemblies may employ straight or curved stabilizer members that are rotatably attached to each other and/or the arms to allow some flexing of the apparatus without causing fatigue, etc.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method of performing an LED fireworks show comprising:

transporting to a site via an over-the-road vehicle a kit comprising:

a support structure assembly;

a plurality of arms adapted to extend radially from said support structure assembly when installed;

one or more LED apparatuses designed to produce a theatrical effect when installed on the support structure assembly;

power and control means for operating said LED apparatuses; and a jib assembly having generally opposite ends adapted for operative connection at one end to a crane assembly and adapted for operative connection at the other end to grip said support structure assembly;

installing said LED apparatuses on said support structure assembly;

installing said arms on said support structure assembly;

powering said LED apparatuses;

lifting the aforementioned into a space by the crane assembly;

positionally affixing and directionally orienting within the space the aforementioned with the jib assembly;

operating the LED apparatuses according to a predetermined programming to emulate a fireworks show, and installing one or more support rings connecting two or more of the plurality of arms that are spaced away from a central hub.

2. The method of claim 1 wherein the LED apparatuses comprise (i) a center LED lighting fixture, and (ii) one or more generally linear arrays of LED lights installed on one or more of the plurality of arms.

3. The method of claim 2, wherein the LED apparatuses further comprise:

one or more hinges attached to one or more of the plurality of arms; and one or more support rings attached to one or more of the plurality of arms.

4. The method of claim 2, wherein the predetermined programming comprises programming any of:

a center burst effect;

a starburst effect;

a sparkle effect;

and a pinwheel effect.

5. The method of claim 4, wherein the LED apparatuses further comprise one or more LED lighting fixtures installed at a distal position on one or more of the arms, and wherein the predetermined programming further comprises an end burst effect.

6. The method of claim 4, wherein the kit further comprises one or more cords including at least a plurality of LEDs and a lightweight support line or cable, and wherein the predetermined programming further comprises a tail effect.

7. The method of claim 4, wherein the LED apparatuses further comprise a cold spark machine, and wherein the predetermined programming further comprises a fountain or waterfall effect.

8. The method of claim 1, wherein the one or more support rings are hinged.

9. A system for emulating a fireworks show without the use of traditional pyrotechnical materials comprising:

a plurality of LEDs each of which is controllable by a controller to produce a fireworks show;

means for programming or otherwise operating the controller from a position geographically remote from the controller;

one or more power supplies for powering the plurality of LEDs;

a support structure assembly adapted to positionally affix and directionally orient the plurality of LEDs;

a mobility means to transport the plurality of LEDs, programming means, power supplies, and support structure assembly;

a jib assembly adapted to grip and pivot the support structure assembly; and a crane assembly adapted to elevate the plurality of LEDs when (i) installed on or in the support structure assembly, and (ii) gripped by the jib assembly;

wherein the support structure assembly includes a central hub, a plurality of arms extending from the central hub, and a one or more support rings spaced away from the central hub.

10. The system of claim 9, wherein at least a subset of the plurality of LEDs is individually controllable from the other LEDs.

11. The system of claim 9, further comprising one or more of the following additional devices:

a cold spark machine;

a smoke or fog machine;

a sound machine;

a bubble machine;

an air cannon with associated lit or lightable objects;

a pitching machine with associated keepsake, promotional, or lit or lightable objects;

a UV emitting or UV activated apparatus or object;

a phosphorescent object;

one or more lasers;

one or more laser reflectors; and one or more light pipes with a LED or laser light source.

12. The system of claim 11, wherein at least one of the additional devices is mounted to the support structure assembly.

13. The system of claim 11, wherein at least one of the additional devices is mounted or operated at the mobility means or a ground space at a site.

14. The system of claim 9, wherein the one or more support rings are formed by one or more hinges.

15. A fireworks or theatrical apparatus comprising:

a central hub;

a plurality of arms extending away from the central hub;

a plurality of light sources attached to the plurality of arms; and a stabilizer assembly that includes a first stabilizer member disposed proximate a first arm of the plurality of arms on a first side of the first arm, a second stabilizer member disposed proximate a second side of the first arm, and a slop joint connector that surrounds the first arm, joining the first stabilizer member to the second stabilizer member.

16. The fireworks or theatrical apparatus of claim 15, wherein at least one of the plurality of arms extends along an at least partially arcuate sweep path.

17. The fireworks or theatrical apparatus of claim 16, wherein at least one of the plurality of arms includes a bent portion.

18. The fireworks or theatrical apparatus of claim 15, wherein at least one of the plurality of arms comprises tube members that are telescopically connected to each other.

19. The fireworks or theatrical apparatus of claim 15, wherein the slop joint connector includes a first plate extending from the first stabilizer member to the second stabilizer member, and a second plate extending from the extending from the first stabilizer member to the second stabilizer member, forming a slot and the first arm extends into the slot.

20. The fireworks or theatrical apparatus of claim 19, wherein the slot defines a clearance between the first stabilizer member, and the first arm.

21. The fireworks or theatrical apparatus of claim 19, wherein the slop joint connector includes a nut and bolt fastener combination connecting the first plate, the second plate, and the first stabilizer member together.

22. The fireworks or theatrical apparatus of claim 19, wherein the slop joint connector includes a pull pin connecting the first plate, the second plate, and the second stabilizer member together.

23. The fireworks or theatrical apparatus of claim 19, wherein the first plate, and the second plate are attached to the first arm.

24. The fireworks or theatrical apparatus of claim 15, wherein the stabilizer assembly includes an adjustable joint having a first bracket, and a second bracket rotatably connected to the first bracket.

25. The fireworks or theatrical apparatus of claim 24, wherein the first bracket defines a first free end that is configured to rotate until the first free end is adjacent the second stabilizer member, and the second bracket includes a second free end that is configured to rotate until the second free end is adjacent the first stabilizer member.

26. The fireworks or theatrical apparatus of claim 25, wherein the first free end is attached to the second stabilizer member, and the second free end is attached to the first stabilizer member.

* * * * *